United States Patent
Walker et al.

(10) Patent No.: US 11,977,896 B2
(45) Date of Patent: May 7, 2024

(54) ISSUING A SEQUENCE OF INSTRUCTIONS INCLUDING A CONDITION-DEPENDENT INSTRUCTION

(71) Applicant: Arm Limited, Cambridge (GB)

(72) Inventors: Matthew James Walker, Cambridge (GB); Mbou Eyole, Soham (GB); Giacomo Gabrielli, Cambridge (GB); Balaji Venu, Cambridge (GB); Wei Wang, Cambridge (GB)

(73) Assignee: Arm Limited, Cambridge (GB)

( * ) Notice: Subject to any disclaimer, the term of this patent is extended or adjusted under 35 U.S.C. 154(b) by 57 days.

(21) Appl. No.: 17/942,554

(22) Filed: Sep. 12, 2022

(65) Prior Publication Data

US 2024/0086202 A1 Mar. 14, 2024

(51) Int. Cl.
*G06F 9/30* (2018.01)
*G06F 9/32* (2018.01)
(Continued)

(52) U.S. Cl.
CPC ........ *G06F 9/3856* (2023.08); *G06F 9/30145* (2013.01); *G06F 9/32* (2013.01);
(Continued)

(58) Field of Classification Search
CPC ...... G06F 9/3856; G06F 9/30145; G06F 9/32; G06F 9/3836; G06F 9/3853; G06F 15/825

See application file for complete search history.

(56) References Cited

U.S. PATENT DOCUMENTS

| | | | |
|---|---|---|---|
| 2013/0086370 A1* | 4/2013 | Burger | G06F 9/30072 712/239 |
| 2014/0201506 A1* | 7/2014 | Parashar | G06F 9/30072 712/229 |

(Continued)

OTHER PUBLICATIONS

Junbin Wang et al., "Acceleration of control flows on Reconfigurable Architecture with a composite method," 52nd ACM/EDAC/IEEE Design Automation Conference (DAC), 2015, pp. 1-6, [retrieved on Dec. 20, 2023]. Retrieved from the Internet <URL: https://ieeexplore.ieee.org/document/7167230> <DOI: 10.1145/2744769.2744789>.*

(Continued)

*Primary Examiner* — Shawn Doman
(74) *Attorney, Agent, or Firm* — NIXON & VANDERHYE P.C.

(57) ABSTRACT

An apparatus, method and computer program, the apparatus comprising processing circuitry to execute instructions, issue circuitry to issue the instructions for execution by the processing circuitry, and candidate instruction storage circuitry to store a plurality of condition-dependent instructions, each specifying at least one condition. The issue circuitry is configured to issue a given condition-dependent instruction in response to a determination or a prediction of the at least one condition specified by the given condition-dependent instruction being met, and when the given condition-dependent instruction is a sequence-start instruction, the issue circuitry is responsive to the determination or prediction to issue a sequence of instructions comprising the sequence-start instruction and at least one subsequent instruction.

20 Claims, 13 Drawing Sheets

(51) Int. Cl.
   *G06F 9/38*      (2018.01)
   *G06F 15/82*     (2006.01)
(52) U.S. Cl.
   CPC .......... *G06F 9/3836* (2013.01); *G06F 9/3853* (2013.01); *G06F 15/825* (2013.01)

(56) References Cited

U.S. PATENT DOCUMENTS

| | | | |
|---|---|---|---|
| 2015/0012729 A1* | 1/2015 | Robison | G06F 8/41 |
| | | | 712/216 |
| 2016/0055004 A1* | 2/2016 | Grochowski | G06F 9/30072 |
| | | | 712/23 |
| 2020/0089503 A1* | 3/2020 | Gupta | G06F 9/3838 |

OTHER PUBLICATIONS

Li Wang et al., "Profile guided optimization for dataflow predication," 13th Asia-Pacific Computer Systems Architecture Conference, 2008, pp. 1-8, [retrieved on Dec. 20, 2023]. Retrieved from the Internet <URL: https://ieeexplore.ieee.org/document/4625471><DOI: 10.1109/APCSAC.2008.4625471>.*

Angshuman Parashar, et al., "Efficient Spatial Processing Element Control Via Triggered Instructions", IEEE Computer Society, May/Jun. 2014, pp. 120-137 (18 pages).

Thomas J. Repetti, et al., "Pipelining a Triggered Processing Element", MICRO-50, Oct. 14-18, 2017, pp. 96-108 (13 pages).

* cited by examiner

Triggered-instruction storage

| Condition(s) | Opcode | Operand(s) | Destination | State update information |
|---|---|---|---|---|
| Condition(s) | Opcode | Operand(s) | Destination | State update information |
| Condition(s) | Opcode | Operand(s) | Destination | State update information |
| Condition(s) | Opcode | Operand(s) | Destination | State update information |

10

Additional instruction storage

| opcode | operand(s) | destination | opcode | operand(s) | destination |
|---|---|---|---|---|---|
| opcode | operand(s) | destination | opcode | operand(s) | destination |
| opcode | operand(s) | destination | opcode | operand(s) | destination |
| opcode | operand(s) | destination | opcode | operand(s) | destination |

ISSUING A SEQUENCE OF INSTRUCTIONS INCLUDING A CONDITION-DEPENDENT INSTRUCTION

BACKGROUND

The present technique relates to the field of data processing.

In a triggered instruction architecture (TIA), there is no program counter, and instead instructions specify conditions under which they are issued ("triggered"). The conditions specified by each instruction are sometimes referred to as "triggers", "trigger conditions" or "predicates", and instructions which specify conditions may be referred to as triggered instructions, condition-dependent instructions or condition-specifying instructions, for example. A TIA is also sometimes referred to as an event-driven architecture.

The conditions specified by the instructions are monitored and if the system state (e.g. updates to the system state due to execution of previous instructions, and updates due to hardware events) matches the state defined in the conditions, then the corresponding instruction is issued ("triggered").

A key advantage of using a TIA is that the instruction fetch, decode and issue logic is much simpler than in a normal processor (e.g. such as a central processing unit, CPU) and hence more transistors (and therefore area and power budget) can be dedicated to the datapath, increasing the compute density.

Moreover, by controlling instruction execution in dependence on system state rather than a program counter, the number of control-flow instructions to be executed can be reduced, and the PE can react quickly to incoming data (the incoming data can "trigger" the appropriate instructions).

SUMMARY

Viewed from one example, the present technique provides an apparatus comprising:
  processing circuitry to execute instructions;
  issue circuitry to issue the instructions for execution by the processing circuitry; and
  candidate instruction storage circuitry to store a plurality of condition-dependent instructions, each specifying at least one condition,
  wherein:
  the issue circuitry is configured to issue a given condition-dependent instruction in response to a determination or a prediction of the at least one condition specified by the given condition-dependent instruction being met; and
  when the given condition-dependent instruction is a sequence-start instruction, the issue circuitry is responsive to the determination or prediction to issue a sequence of instructions comprising the sequence-start instruction and at least one subsequent instruction.

Viewed from another example, the present technique provides a method comprising:
  issuing instructions for execution by processing circuitry;
  storing a plurality of condition-dependent instructions, each specifying at least one condition,
  issuing a given condition-dependent instruction in response to a determination or a prediction of the at least one condition specified by the given condition-dependent instruction being met; and
  when the given condition-dependent instruction is a sequence-start instruction, issuing, in response to the determination or the prediction, a sequence of instructions comprising the sequence-start instruction and at least one subsequent instruction.

Viewed from another example, the present technique provides a computer program comprising instructions which, when executed on a computer, control the computer to provide:
  processing program logic to execute instructions; and
  issue program logic to issue the instructions for execution by the processing circuitry;
  wherein:
  the issue program logic is configured to issue a given condition-dependent instruction of a plurality of candidate condition-dependent instructions, each specifying at least one condition, in response to a determination or a prediction of the at least one condition specified by the given condition-dependent instruction being met; and
  when the given condition-dependent instruction is a sequence-start instruction, the issue program logic is responsive to the determination or prediction to issue a sequence of instructions comprising the sequence-start instruction and at least one subsequent instruction.

Viewed from another example, the present technique provides a computer-readable storage medium storing the computer program described above. The computer-readable storage medium may be transitory or non-transitory.

Further aspects, features and advantages of the present technique will be apparent from the following description of examples, which is to be read in conjunction with the accompanying drawings.

BRIEF DESCRIPTION OF THE DRAWINGS

FIG. 7 shows an example of how condition-dependent instructions and non-condition-dependent instructions can be stored;

DESCRIPTION OF EXAMPLES

Figure 1:
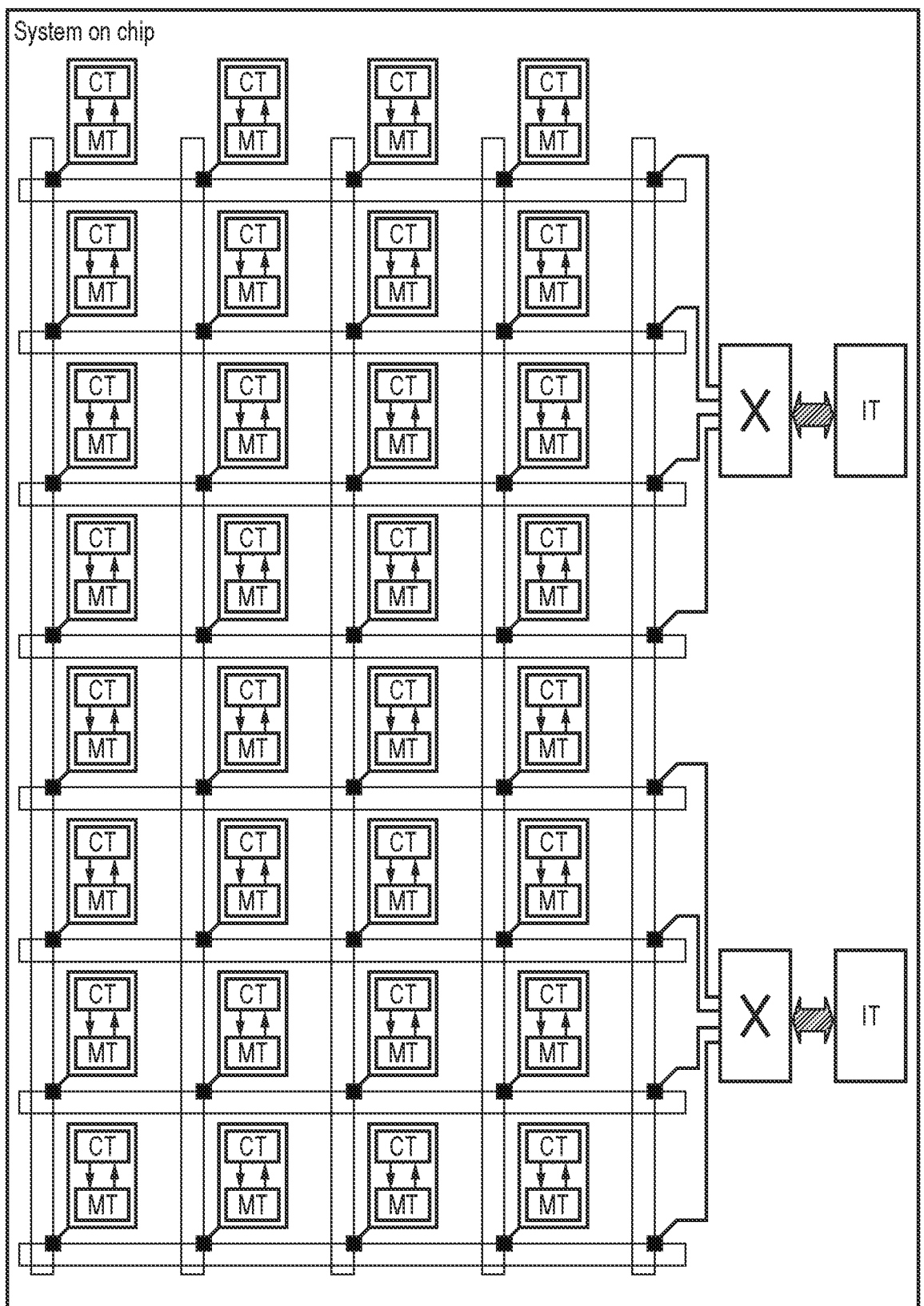
FIG. 1 illustrates an apparatus comprising a number of triggered-instruction processing elements coupled by an on-chip communication interconnect.

Before discussing example implementations with reference to the accompanying figures, the following description of example implementations and associated advantages is provided.

In accordance with one example configuration there is provided an apparatus comprising processing circuitry to execute instructions (which include condition-dependent instructions but may also include instructions which do not specify conditions), issue circuitry to issue the instructions for execution by the processing circuitry, and candidate instruction storage circuitry to store a plurality of condition-dependent instructions, each specifying at least one condition. For example, the plurality of condition-dependent instructions stored by the candidate instruction storage circuitry may be considered to be a pool of candidate condition-dependent instructions whose conditions are to be monitored, and from which instructions can be selected to be issued. The at least one condition may be directly identified by a given condition-dependent instruction (e.g. it may have a condition field which directly specifies the condition) or it may depend on both information specified in the instruction and the contents of a control register or other storage in combination. The issue circuitry is configured to issue a given condition-dependent instruction in response to a determination or a prediction of the at least one condition specified by the given condition-dependent instruction being met.

Hence, the apparatus in this example is configured to execute instructions according to a TIA, in which the issue of a given condition-dependent instruction by the issue circuitry depends on an evaluation of its associated at least one condition—note that this is different to conditional instructions in a program counter (PC) based architecture, where it is the execution, or result of the execution, of the instructions which are conditional on a condition, while the issue of a conditional instruction in a PC-based architecture is still based on the PC or a prediction of how the PC will evolve.

As discussed above, there are several advantages to a TIA. As explained above, condition-dependent instructions in a TIA are typically monitored to determine whether their conditions have been met. This can place a limit on the number of condition-dependent instructions which can be available for issue—e.g. the size of a pool of candidate condition-dependent instructions (e.g. from which an instruction to be issued might be selected) can be limited in a TIA. This is because the logic to monitor the conditions for a bigger pool of instructions becomes unfeasibly large. This contrasts with, for example, a program counter (PC) based architecture, in which it can be common to provide large instruction caches from which an instruction to be issued can be fetched (based on the PC or a prediction of how the PC will evolve).

In the present technique, to address this problem, when the given condition-dependent instruction is a sequence-start instruction, the issue circuitry is responsive to the determination or prediction to issue a sequence of instructions comprising the sequence-start instruction and at least one subsequent instruction. Hence, the entire sequence of instructions (including the sequence-start instruction—which is one of the plurality of condition-dependent instructions stored in the candidate instruction storage—and the at least one subsequent instruction) is issued in response to a condition specified by one of the instructions (the sequence-start instruction) being met. This contrasts with a PC-based architecture—e.g. since issue (as opposed to just the execution) of the sequence of instructions depends on whether a condition specified by one of the instructions is met—and also differs from what one might expect to see in a TIA—where one might expect each instruction to be issued in response to its own condition(s) being satisfied (as opposed to being issued in response to a condition specified by another instruction being satisfied).

However, in the present technique, in addition to certain conditions triggering execution of single instructions, some conditions may trigger execution of blocks (also referred to as "sequences" or "branches") of instructions. For example, a sequence of instructions (wherein each instruction in the sequence may, in some examples, have a separate opcode) may include the sequence-start instruction mentioned above (which is a condition-dependent instruction, and hence is issued in response to an associated condition being determined or predicted to have been met) and at least one subsequent instruction to be issued after the sequence-start instruction. The at least one condition specified by the sequence-start condition can be considered to apply to the entire sequence of instructions (e.g. the entire sequence of instructions may be issued in response to the condition specified by the sequence-start instruction being determined or predicted to have been met). Accordingly, this can remove the need for the at least one subsequent instruction to specify at least one condition (e.g. since it can be issued automatically as part of the sequence once the condition specified by the sequence-start instruction has been met), which can reduce the amount of storage space needed to store instructions in the sequence, which in turn reduces power consumption and improves performance (e.g. in terms of latency associated with accessing the instructions). Moreover, even if a condition is specified by the at least one subsequent instruction (which may be appropriate in some implementations, if it is useful to maintain a consistent format for every instruction), it does not need to be included in the plurality of condition-dependent instructions to be stored in the candidate instruction storage, and does not need to be monitored to determine when its conditions are met—this can reduce power consumption and improve performance, by increasing the number of computations that can be performed for a given cost (e.g. the amount of circuit area taken up by the associated logic, and//or the power consumption associated with that logic) associated with monitoring the conditions of the condition-dependent instructions in the candidate instruction storage.

Hence, modifying a TIA so that, in at least some situations, a sequence of instructions can be triggered rather than simply triggering issue of a single instruction can help to reduce power consumption and improve performance. The triggering of the sequence of instructions is based on monitoring of a single shared set of one or more trigger conditions, rather than separately specified sets of one or more trigger conditions for each of the instructions in the sequence.

Note that while some implementations may require the condition specified by a condition-dependent instruction (such as the sequence-start instruction) to actually have been met in order for that instruction to be issued, other implementations may allow a condition-dependent instruction to be issued if it is predicted that its condition will be met before it is executed.

In addition, note that the at least one condition specified by each condition-dependent instruction can be specified directly by information encoded in the instruction encoding itself, and/or it can be dependent on information stored in a control register or other configuration storage.

In some examples, the plurality of condition-dependent instructions comprises a pool of candidate condition-dependent instructions, and the issue circuitry comprises instruction selection circuitry to perform a selection process to:

determine whether the at least one condition specified by any of the condition-dependent instructions in the pool of candidate condition-dependent instructions has been or is predicted to have been met—for example, the instruction selection circuitry may monitor the pool of candidate instructions, which could include checking the condition(s) specified by each of the instructions whenever the state of the apparatus changes; and select, in dependence on whether the at least one condition specified by any of the condition-dependent instructions in the pool of candidate condition-dependent instructions has been or is predicted to have been met, a next instruction to issue, the next instruction being selected from the pool of candidate condition-dependent instructions. For example, the selection circuitry may select an instruction for which the at least one condition has been met.

In some examples, an encoding of the at least one subsequent instruction excludes a condition field indicating the at least one condition.

As noted above, since the present technique allows issue of a sequence of multiple instructions to be triggered in response to a condition specified by one condition-dependent instruction (e.g. the sequence-start instruction) being met, this means that the at least one subsequent instruction in the sequence does not need to specify a condition. Hence, the at least one subsequent instruction can have an encoding which excludes a condition field. This allows for a reduction in the amount of space needed to store the at least one subsequent instruction, and hence further improves performance and reduces power consumption as discussed above.

In some examples, each condition-dependent instruction specifies state update information indicative of a state update for use in evaluating whether the at least one condition specified by one or more of the plurality of condition-dependent instructions has been met, and an encoding of the at least one subsequent instruction excludes a state update field indicating the state update information.

The state update information—sometimes referred to as "predicate information"-specified by a condition-dependent instruction may be used to update a state of the processing circuitry, and this state update may trigger a condition specified by another condition-dependent instruction to be met. This means that when one condition-dependent instruction is executed, this may trigger a next condition-dependent instruction to be issued, hence allowing instructions to be executed in a defined order without the need for a program counter.

In some examples, the sequence-start instruction specifies information indicative of a location at which one or more of the at least one subsequent instruction is stored.

For example, since the at least one subsequent instruction may not have a condition which needs to be monitored, it may not be stored in the candidate instruction storage circuitry. Hence, it can be useful for the sequence-start instruction to specify the location at which the at least one subsequent instruction is stored (e.g. by specifying a memory address associated with the location storing the at least one subsequent instruction). In addition, this provides a convenient way for the at least one subsequent instruction to be identified.

In a particular example, additional instruction storage circuitry (e.g. separate from the candidate instruction storage circuitry) may be provided to store the at least one subsequent instruction. The additional instruction storage circuitry could be an instruction cache or memory, for example.

In some examples, a number of bits in each of the at least one subsequent instruction is less than a number of bits in each of the plurality of condition-dependent instructions.

For example, this could be due to the fact that the at least one subsequent instruction does not specify information indicative of the at least one condition (also the at least one subsequent instruction can omit the state update information described above). Hence, the at least one subsequent instruction can be stored in a more compact manner, since it comprises fewer bits and hence requires less space in storage.

In some examples, the issue circuitry is configured to suppress interrupting issuing the sequence of instructions by issuing a further condition-dependent instruction before all of the instructions in the sequence have been issued.

In some situations it may be useful to, once the sequence of instructions has begun to be issued, prevent any other instructions (e.g. instructions that are not part of the sequence) from being issued until after all of the sequence of instructions has been issued. This can simplify the control overhead, since there is no need to consider resuming or re-starting a previously partly completed sequence. Hence, in some situations, it can be useful to prevent any instructions outside the sequence from being issued until after all of the instructions in the sequence of instructions have been issued (or, in some cases, until after all of the instructions in the sequence have been executed).

In some examples, the issue circuitry is responsive to interrupt permission information specified by the sequence-start instruction to determine whether it is permitted to interrupt issuing the sequence of instructions to issue a further condition-dependent instruction before all of the instructions in the sequence have been issued.

While it can be useful, as explained above, to prevent any instructions from outside of the sequence from being issued until all of the instructions in the sequence have been issued, the inventors of the present technique realised that there may be some situations in which the advantages of allowing issue of an instruction to interrupt issuing of the sequence of instructions outweigh the potential performance cost associated with the interruption. For example, permitting interruption (while potentially more complex in control logic) can help to allow more important instructions to be processed earlier rather than delaying to complete a previously issued sequence of instructions. Hence it can be useful to provide a mechanism which, in some situations, allows the sequence to be interrupted to issue another instruction.

However, the present technique recognises that not all sequences of instructions may be capable of being interrupted and/or restarted/resumed (e.g. some sequences could define atomic functions or may trigger updates to machine state that trigger other instructions to execute, which might be inefficient if part of the sequence is not done yet). Hence, in this example, the sequence-start instruction specifies interrupt permission information (e.g. this could be a flag in the instruction encoding) to indicate whether or not it is permissible to issue a further condition-dependent instruction before all of the instructions in the sequence have been issued.

In some examples, the issue circuitry is configured, in response to determining that it is permitted to interrupt issuing the sequence of instructions, to determine, based on an instruction priority order associated with the sequence-start instruction and the further condition-dependent instruction, whether to interrupt issuing the sequence of instructions by issuing the further condition-dependent instruction.

As explained above, there may be some situations in which the advantages of allowing issue of an instruction to interrupt issuing of the sequence of instructions outweigh the performance cost associated with the interruption.

Hence, the inventors realised that it could be useful to consider a priority order associated with the sequence-start instruction and one or more other condition-dependent instructions in determining whether or not to allow issue of a particular instruction to interrupt the sequence. As a particular example, the issue circuitry may compare a priority level of the sequence-start instruction with a priority level of the further condition-dependent instruction, and allow issue of the further condition-dependent instruction to interrupt issue of the sequence of instructions when it has a higher priority level than that of the sequence-start instruction. In this way, instructions whose timely execution is critical can be associated with a priority level that reflects this. Note that the priority order of any two instructions may be implicit—for example, it may be indicated by an order of the instructions in memory or in the candidate instruction storage circuitry—or it could be specified explicitly in the sequence-start instruction, in addition to the interrupt permission information.

Moreover, in some examples, the issue circuitry may determine whether or not to interrupt issue of the sequence of instructions based on the priority order independently of the interrupt permission information (which may or may not be specified by the sequence-start instruction in such examples).

In some examples, the apparatus comprises sequence state storage circuitry to store sequence state to enable execution of the sequence of instructions to restart after issuing the sequence of instructions is interrupted.

In this example, if the issuing of the sequence of instructions is interrupted (e.g. in order to issue another instruction from outside the sequence), information (sequence state) is stored to enable issuing and execution of the sequence of instructions to be restarted (e.g. either restarted from the beginning of the sequence or resumed from the point of the interruption) once the interruption has been dealt with (e.g. once the other instruction has been issued and/or executed). The sequence state saved to the sequence state storage circuitry could include any data in registers or other temporary storage structures at the time of the interruption, such as the results of any calculations performed when executing the sequence of instructions, and/or could include information indicative of a next instruction (which could be the sequence-start instruction in some implementations) in the sequence to be executed after the interruption has been dealt with. The sequence state storage circuitry could be a dedicated storage structure (e.g. a cache, memory or register), or it could be a region in storage structure that is also used for other purposes (e.g. it could be a region in a shared memory).

Storing the sequence state can be advantageous, because it can reduce the amount of computation that needs to be repeated when issuing and execution of the sequence of instructions resumes. However, it should be noted that it is not essential for issuing of the sequence to be resumed (as opposed to restarted) once the interruption has been dealt with. Instead, the issue circuitry can just restart the sequence from the beginning. In which case, the issue circuitry may, at the interruption, store an indication of the sequence-start instruction in the sequence state storage circuitry, to indicate that it is the sequence-start instruction that is to be issued next.

In some examples, the issue circuitry comprises condition prediction circuitry to suppress, in response to a speculation suppression indication identified by the sequence-start instruction, speculation of whether the at least one condition specified by the sequence-start instruction has been met.

In a TIA, it can be helpful to provide condition prediction circuitry to speculate (e.g. predict) when the conditions specified by condition-dependent instructions will be met, so that the instructions can be fetched and issued before it is known for certain that they will be needed. This can improve performance, since it reduces a delay between a condition being met and an instruction triggered by that condition being issued. However, there is a potential cost associated with speculation, because if a mis-speculation occurs (e.g. an instruction is issued as a result of an incorrect prediction), it may be that processing needs to be unwound to reset processor state to a time before execution of the mis-speculated instruction. Often, the benefits of speculation outweigh the costs. However, the inventors realised that for a sequence-start instruction, a mis-speculation would have a greater cost than for many other instructions, since issue of the speculation-start instruction triggers issue of the at least one subsequent instruction. Hence, the inventors realised that it could be helpful to include a speculation suppression indication, identified by the sequence-start instruction, to indicate to the condition prediction circuitry that speculation should be suppressed for this instruction.

In some examples, the apparatus comprises counter circuitry to maintain one or more hardware counters, and when an instruction specifies a counter-advance indication in addition to identifying a data processing operation to be performed, the processing circuitry is responsive to the counter-advance indication specified by an instruction to issue a counter advance signal to trigger the counter circuitry to advance a count value of at least one of the one or more hardware counters.

As explained above, a TIA does not use a program counter or branch instructions to control the flow (execution order) of instructions, and instead instructions specify conditions and are issued in response to these conditions being met. However, the inventors of the present technique realised that it can nonetheless be useful to provide, in hardware, one or more counters which can be incremented and/or decremented in response to counter-advance indications specified by instructions. For example, a counter-advance indication can be specified by an instruction in addition to any data processing operation specified by the instructions (e.g. as opposed to providing a dedicated counter-advance instruction—however it is to be appreciated that such instructions may also be provided). Such hardware counters can have any of a variety of uses in an apparatus supporting a TIA, including but not limited to:

managing control flow, for example at run-time, to reduce the number of operations that need to be performed to control flow of instructions;

controlling complex data read and write patterns and managing program looping and repetition without additional software overhead;

addressing values in a register file or memory, e.g. for use in data transformations.

Note that "advancing" a counter could be incrementing the counter (increasing the count value of the counter) or decrementing the counter (decreasing the count value of the counter), and the amount by which the counter is advanced could be one or more than one.

In some examples, for at least one encoding of condition information indicating the at least one condition specified by each of the plurality of condition-dependent instructions, the issue circuitry is configured to determine whether the at least one condition is met depending on whether a counter event has occurred for a given hardware counter maintained by the counter circuitry.

This is an example of how the one or more hardware counters described above can be used to manage control flow. In this example, counter events are hardware events that can trigger issue of condition-dependent instructions. This can be a useful way of managing control flow in a TIA.

Note that the condition information of a condition-dependent instruction could also indicate which counter can trigger its issue, if there is more than one hardware counter. Alternatively, information in a control register or other configuration storage may indicate which counter should trigger which condition-dependent instructions. Hence, it should be appreciated that the "condition information" for a given instruction can include both information encoded in a condition-dependent instruction encoding and/or information stored in a control register or other configuration storage.

In some examples, the counter event comprises a detection of at least one of:
- an overflow signal asserted by the counter circuitry in response to an overflow event; and
- a secondary event signal asserted by the counter circuitry in response to the count value being advanced to a predetermined value.

Each hardware counter has upper and lower threshold (e.g. maximum and minimum) count values. Each of these thresholds could be set by control information (e.g. "top" and/or "bottom" values, which may be stored in configuration storage such as a control register) or could be implicitly defined (e.g. the lower threshold could implicitly be zero, while the upper threshold may depend on a number of bits available to store the count value). An overflow event occurs when the count value would be incremented above its upper threshold value or decremented below its lower threshold, at which point the count value may "wrap around" to the other threshold value. The counter circuitry may, therefore, assert a signal when a hardware counter overflows, and this can be an example of a counter event which may trigger issue of one or more condition-dependent instructions. Note that the overflow signal may, in some examples, be asserted in response to the top/bottom value being reached (e.g. before the counter wraps around) or in response to the counter wrapping around.

In addition to (or instead of) asserting a signal when a counter overflows, the counter control circuitry may assert a signal when the count value of a hardware counter is advanced (incremented or decremented) to some predetermined value (e.g. other than the top/bottom value), and this may be an example of a counter event (e.g. the secondary event mentioned above). For example, configuration storage may store information indicative of which count value or values should trigger this signal to be asserted. This could (for example) allow a signal to be asserted periodically by a counter, such as on each even count value or similar. In some examples, a modulo value may be defined and the secondary event signal may be generated each time the result of C modulo M (where C is the counter value and M is the modulo value) has a particular value (e.g. 0).

In some examples, the processing circuitry is responsive to at least one encoding of an instruction to use the count value as an operand or to calculate a register identifier to identify a source register or a destination register.

While one use for the at least one hardware counter can be to trigger issue of condition-dependent instructions (as discussed above), another potential use is in addressing values in a register file or memory. For example, using the count value of one or more hardware counters as an operand or to identify a source/destination register or memory location (e.g. with the count value being applied as an offset relative to a base value) can allow an identical instruction to operate on different operands based on the count value. This can be useful, for example, in data transformations.

In some examples, the apparatus comprises configuration data storage circuitry to store counter configuration information associated with the counter circuitry, wherein the counter circuitry is responsive to the counter advance signal to determine an updated count value based on the counter configuration information, and the counter configuration information is indicative of, at least one of:
- an advancement amount to be applied to the count value; and
- a top count value of the counter.

The advancement amount may indicate whether a counter should be incremented or decremented in response to a counter-advance indication specified by a condition-dependent instruction, and/or by how much the counter should be incremented/decremented. The top count value may, for example, be an upper threshold value for the counter, beyond which an incrementing counter may wrap around to zero (or another bottom count value), or to which a decrementing counter may wrap around.

In some examples, the counter circuitry is configured to maintain a plurality of hardware counters, and when a chain overflow indication associated with a first hardware counter and a second hardware counter is set, the counter circuitry is responsive to a counter overflow event associated with the first hardware counter to advance the second hardware counter.

In this example, counters can be chained together, so that overflow of one counter can trigger an increment to another counter. This can be useful in a number of situations, since the second hardware counter effectively counts how many times the first hardware counter has overflowed. For example, this could allow the counters to, together, count to a maximum value that is significantly higher (e.g. an order of magnitude) than would be possible with a single counter (e.g. if each counter wraps around beyond a value of 7 (e.g. a top value of 7, or 111 in binary), a single counter can count to 7, but two chained counters can count to 63).

The techniques discussed above can be implemented in a hardware apparatus which has circuit hardware implementing the processing circuitry, issue circuitry, candidate instruction storage circuitry and other hardware features described above, which support condition-dependent instructions including the sequence-start instruction as part of the native instruction set architecture supported by the decode circuitry and processing circuitry.

However, in another example the same techniques may be implemented in a computer program (e.g. an architecture simulator or model) which may be provided for controlling a host data processing apparatus to provide an instruction execution environment for execution of instructions from target code. The computer program may include issue program logic for issuing instructions of the target code to processing program logic, which may control a host data processing apparatus to perform data processing in dependence on the instructions in the target code. Hence, the issue program logic emulates the functionality of the issue circuitry of a hardware apparatus as discussed above. The issue program logic and the processing program logic include support for the sequence-start instruction, which has the same functionality as described above for the hardware example.

Hence, such a simulator computer program may present, to target code executing on the simulator computer program, a similar instruction execution environment to that which would be provided by an actual hardware apparatus capable of directly executing the target instruction set, even though there may not be any actual hardware providing these features in the host computer which is executing the simulator program. This can be useful for executing code written for one instruction set architecture on a host platform which does not actually support that architecture. Also, the simulator can be useful during development of software for a new version of an instruction set architecture while software development is being performed in parallel with development of hardware devices supporting the new architecture. This can allow software to be developed and tested on the simulator so that software development can start before the hardware devices supporting the new architecture are available.

Note that, while the apparatus simulated by the simulator code relates to a TIA, it is not necessary for the host data processing apparatus itself to operate according to a TIA. For example, if the host data processing apparatus has a PC-based architecture, the simulator program may, nonetheless, emulate a TIA when executed by the host data processing apparatus.

Particular examples will now be described with reference to the figures.

FIG. 1 schematically illustrates a data processing apparatus 10 arranged as a spatial architecture according to various examples of the present techniques. Spatial architectures can accelerate some applications by unrolling or unfolding the computations, which form the most time-consuming portion of program execution, in space rather than in time. Computations are unrolled in space by using a plurality of hardware units capable of concurrent operation. In addition to taking advantage of the concurrency opportunities offered by disaggregated applications which have been spread out on a chip, spatial architectures, such as data processing apparatus 10, also take advantage of distributed on-chip memories. In this way, each processing element is associated with one or more memory blocks in close proximity to it. As a result, spatial architectures can circumvent the von-Neumann bottleneck which hinders performance of many traditional architectures.

The data processing apparatus 10 comprises an array of processing elements (compute/memory access clusters) connected via an on-chip communication interconnect, such as a network on chip. The network is connected to a cache hierarchy or main memory via interface nodes, which are otherwise referred to as interface tiles (ITs) and are connected to the network via multiplexers (X). Each processing element comprises one or more compute tiles (CTs) and a memory tile (MTs). While FIG. 1 shows a 1:1 mapping between CTs and MTs, other examples could share a MT between more than one CT. The CTs perform the bulk of the data processing operations and arithmetic computations performed by a given processing element (PE). The MTs act as memory access control circuitry and have the role of performing data accesses to locally connected memory (local storage circuitry) and data transfers to/from the more remote regions of memory and inter-processing element memory transfers between the processing element and other processing elements.

In some example configurations each of the PEs comprises local storage circuitry connected to each memory control circuit (MT) and each memory control circuitry (MT) has direct connections to one processing circuit (CT). Each PE is connected to a network-on-chip which is used to transfer data between memory control circuits (MTs) and between each memory control circuit (MT) and the interface node (IT).

In alternative configurations local storage circuitry is provided between plural processing elements and is accessible by multiple memory control circuits (MTs). Alternatively, a single MT can be shared between plural CTs.

The processing circuitry formed by the respective compute/memory access clusters (CTs/MTs) shown in FIG. 1 may, for example, be used as a hardware accelerator used to accelerate certain processing tasks, such as machine learning processing (e.g. neural network processing), encryption, etc. The ITs may be used to communicate with other portions of a system on chip (not shown in FIG. 1), such as memory storage and other types of processing unit (e.g. central processing unit (CPU) or graphics processing unit (GPU). Configuration of control data used to control the operation of the CTs/MTs may be performed by software executing on a CPU or other processing unit of the system.

The CTs (or the cluster of CTs and MTs as a whole) can be seen as triggered-instruction processing elements, which execute instructions according to a triggered instruction architecture, rather than a program-counter-based architecture.

In a conventional program-counter-based architecture, a program counter is used to track sequential stepping of program flow through a program according to a predefined order defined by the programmer or compiler (other than at branch points marked by branch instructions). The correct sequence through the program is sequential other than that the branch points. At a branch point there are only two options for the next step in the program flow (taken or not-taken). Although a processor implementation may use techniques such as out of order processing and speculation to execute instructions in a different order from the program order, the results generated must be consistent with the results that would have been generated if the instructions were executed in program order.

In contrast, for a triggered instruction architecture (TIA), a number of triggered instructions (also referred to as condition-dependent instructions) are defined by the programmer or compiler which have no predefined order in which they are supposed to be executed. Instead, each triggered instruction specifies the trigger conditions to be satisfied by the machine state of the processing element for that instruction to validly be issued for execution. In a given cycle of determining the next instruction to issue, a triggered-instruction processing element can monitor multiple triggered instructions in the same cycle to check whether their trigger conditions are satisfied (rather than examining, at most, the conditions for taking or not-taking a single branch instruction in order to determine the next instruction to be executed after the branch, as in a program-counter based architecture).

It is possible for a triggered-instruction processing element to use speculation to predict which instructions will satisfy their respective trigger conditions, so that instructions can be issued before the trigger conditions are actually satisfied. This helps allow a processing pipeline to be more fully utilised (compared to the case in the absence of speculation, when the processing element waits for a given instruction to update the machine state before evaluating whether the machine state satisfies trigger conditions for another instruction). Such speculation can help to improve performance. However, even if speculation is used so that instructions are issued for execution before their trigger conditions are actually satisfied, the end result should be consistent with the result that would have been achieved if the update to machine state by one instruction was made before evaluating the trigger conditions for selecting the next instruction to be issued for execution. Hence, if the speculation was incorrect and an instruction was issued for execution but it is determined later that the trigger conditions for that instruction were not satisfied, then a recovery operation may be performed to flush results which could be incorrect and resume execution from a correct point prior to the mis-speculation.

Event-driven (triggered) spatial architectures such as this can reduce the control flow overhead in program execution and effectively map out applications into "space" rather than time alone. In a typical event-driven spatial architecture, the PEs are configured for each specific application, which entails loading the instructions into the instruction memory of each PE and loading configuration settings into control registers. Two key goals of this established event-driven approach are to (1) reduce the complexity and physical area of the hardware used to issue instructions and (2) reduce the number of instructions required to manage program control-flow through issuing instructions based on data availability. In these many-core systems, PE area is a primary design constraint.

Figure 2:
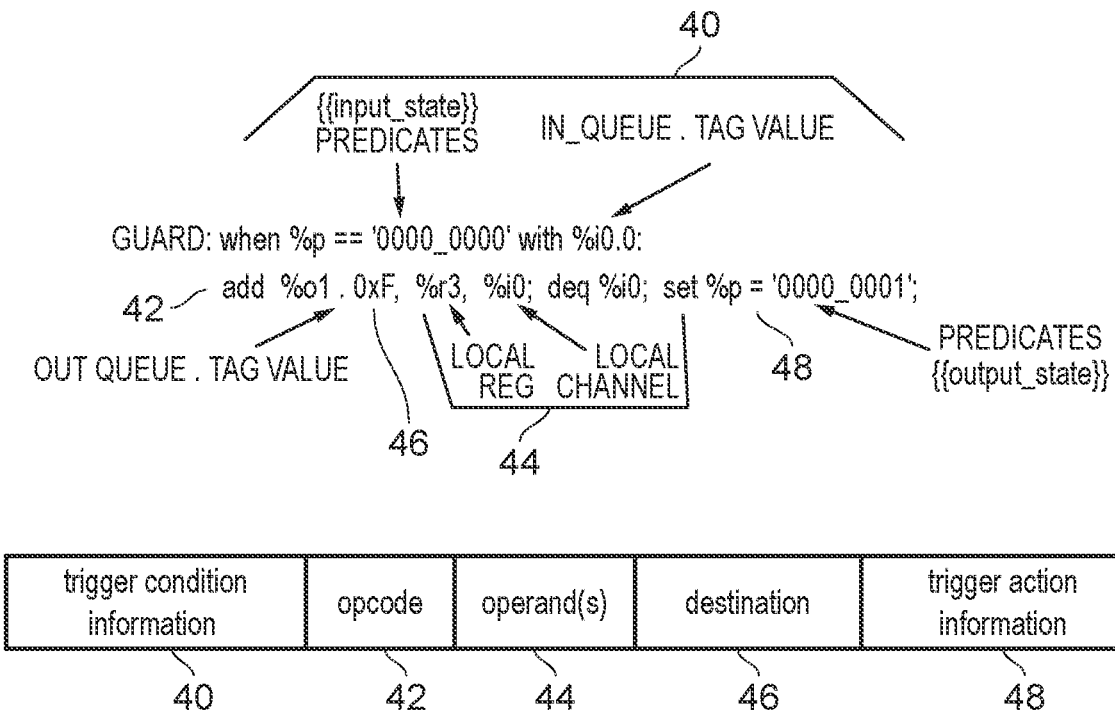
FIG. 2 illustrates an example of a triggered instruction.

FIG. 2 illustrates an example of a triggered instruction. The lower part of FIG. 2 illustrates an example of fields of an instruction encoding, while the upper part of FIG. 2 shows information specified (in high level code representation) for an example of a triggered instruction by a programmer/compiler. The triggered instruction specifies:
  trigger condition information 40 (e.g. a condition field indicative of at least one condition) indicating one or more trigger conditions which are to be satisfied by machine state of the processing element for the instruction to be validly issued for execution.
  an opcode 42 identifying the type of processing operation to be performed in response to the instruction (e.g. add in the high-level code example of FIG. 2).
  one or more operands 44 for the processing operation;
  a destination location 46 to which the result of the processing operation is to be output; and
  trigger action information 48 (state update information) indicating one or more updates to machine state of the processing element to be made in response to the execution of the triggered instruction.

It will be appreciated that while the fields of the instructions are shown in a particular order in FIG. 2, other implementations could order the fields differently. Also, information shown as a single field in the encoding of FIG. 2 could be split between two or more discontiguous sets of bits within the instruction encoding.

In this example, the trigger condition information includes predicate information and input channel availability information. The predicate information and input channel availability information could be encoded separately in the trigger condition information, or represented by a common encoding.

The predicate information specifies one or more events which are to occur for the instruction to be validly issued. Although other encodings of the predicate information are also possible (e.g. with each value of the predicate information representing a certain combination of events that are to occur, not necessarily with each event represented by a separate bit in the encoding), a relatively simple encoding can be for each bit of the predicate indication to correspond to a different event and indicate whether that event is required to have occurred for the instruction to be validly issued for execution. Hence, if multiple bits are set, the trigger conditions require each of those events to occur for the instruction to be issued. An "event" represented by the predicate information could, for example, be any of:
  occurrence of a hardware-signalled event (e.g. a reset, an interrupt, a memory fault, or an error signal being asserted).
  a buffer full/empty event caused by one of the buffer structures described below becoming full or empty.
  a software-defined event which has no particular hardware-defined meaning. Software can use such predicate bits to impose ordering restrictions on instructions. For example, if a first instruction should not be executed until a second instruction has executed, the second instruction can specify (in its trigger action information 48) that a selected predicate bit should be set in response to the second instruction, and the first instruction can specify (in its trigger condition information 40) that the selected predicate bit should be set in order for the first instruction to validly be issued for execution.

The meaning of particular predicate bits may also depend on control state stored in a configuration register or other configuration storage, which affects the interpretation of the predicate bits. For example, FIG. 2 shows an 8-bit predicate field which allows for 256 different combinations of events to be encoded (e.g. a combination of 8 different events in any independent combination of ON/OFF settings for each event if a bit per event is allocated, or 256 more arbitrary combinations of events if the encoding does not allocate a separate bit per event). The configuration register may store control which sets of events are represented by each encoding, selecting events from a larger set of events supported in hardware.

The trigger action information 48 can be defined using output predicates in a corresponding way to the input predicates defined for the trigger condition information 40.

Figure 3:
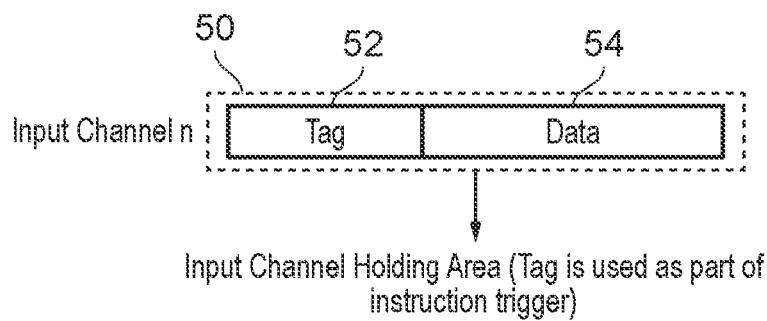
FIG. 3 illustrates an example of a tagged data item received on an input channel.

A given triggered-instruction processing element (CT) may receive input data from a number of input channels, where each input channel may be a physical signal path receiving input data from a particular source. The source of the input data could be, for example, the memory tile MT associated with that CT or a MT shared between a cluster of CTs including the given CT, or could be the on-chip network linking with other sets of CTs, or could be a dedicated signal path (separate from the main network on chip between CTs) between a particular pair of CTs or cluster of CTs. As shown in FIG. 3, a given input channel n receives tagged data items 50 comprising a tag value 52 and data value 54. The tag value 52 is an identifier used to identify the purpose of the data and can be used by the triggered-instruction processing element (CT) to control the triggering of triggered instructions.

Hence, as shown in FIG. 2, the trigger condition information 40 could also include an input data availability condition which indicates that valid issue of the instruction also depends on availability of input data on a particular input data channel. For example, the high level instruction shown at the top of FIG. 2 indicates in its trigger conditions an identifier "% i0.0" signifying that valid issue requires availability of input data having a particular tag value "0" on a particular input channel (% i0). Of course, the indication "% i0.0" is just an example representation of this information at a high level and it will be appreciated that, in the instruction encoding itself, the trigger condition information 40 may encode in other ways the fact that triggering of the instruction depends on input data availability of data having a specified tag value on a specified input channel. It is not essential to always specify a particular tag value required to be seen in order for the trigger conditions to be satisfied. The triggered instruction architecture may also support the ability for the instruction to be triggered based on availability of input data (with any tag value) on a specified input channel.

The operands 44 for the triggered instruction can be specified in different ways. While FIG. 2 shows an instruction having two operands, other instructions may have fewer operands or a greater number of operands. An operand can be identified as being stored in a register addressable using the local register address space of the triggered-instruction processing element (CT). See for example the operand identified using the identifier "% r3" in FIG. 2, indicating that the operand is to be taken from register number 3. Also, an operand can be identified as being the data value taken from a particular input channel, such as input channel "% i0" as shown in FIG. 2. Again, while FIG. 2 shows the generic case where any data from input channel % i0 may be processed by the instruction, it may also be possible to specify that data having a particular tag value should be used as the operand (e.g. the operand could be specified as % i0.0×5, indicating that the operand is the data value having tag 0×5 on input channel % i0).

Similarly, the destination location 46 for the instruction could be either a register in the CT's local register address space or (as in the example of FIG. 2) an indication of an output data channel onto which the result of the instruction should be output. The output data channel may be a signal path passing data to the same CT or another CT, or to the CT's or other CT's MT, or to the network on chip. The destination location 46 can identify a tag value to be specified in the tagged data item 50 to be output on the output channel. For example, the instruction in FIG. 2 is specifying that a data value tagged with tag value 0xF should be output on output channel % o1.

Figure 4:
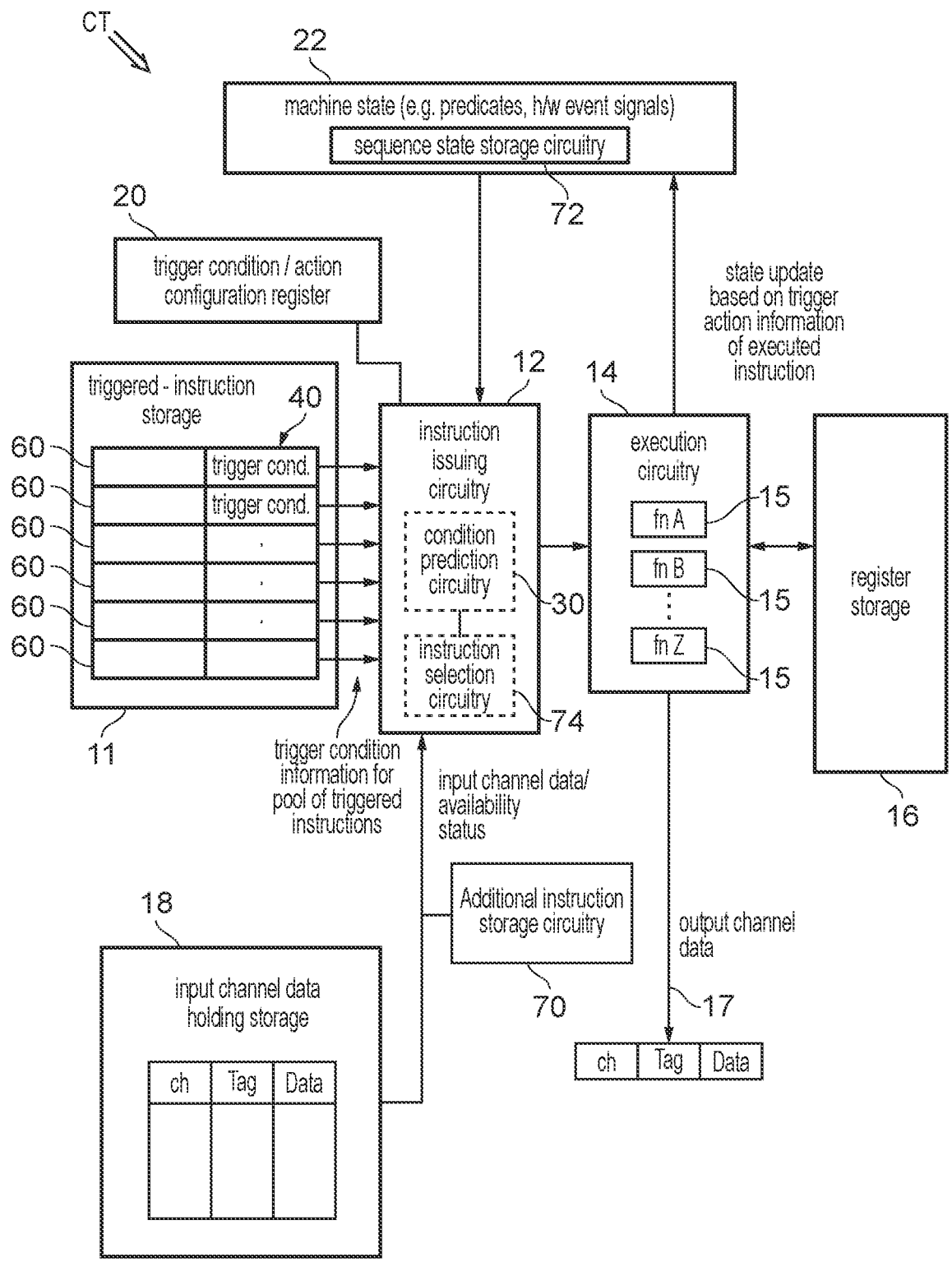
FIG. 4 illustrates an example of triggered-instruction processing element.

FIG. 4 illustrates an example of circuitry included in a given triggered-instruction processing element (in particular, the CT of the processing element) for processing triggered instructions. Triggered-instruction storage circuitry 11 includes a number of storage locations 60 for storing respective triggered-instructions. The trigger condition information 40 of those instructions is made available to instruction issuing circuitry 12 which analyses whether the trigger conditions 40 for the pool of triggered instructions are determined to be satisfied by the machine state 22 (and, if applicable for a given instruction, also determines whether the trigger conditions are satisfied based on input channel data availability status of input channel data which has been received from input channels and is being held in input channel data holding storage 18). The machine state 22 used to evaluate trigger conditions may include hardware event signals indicating whether various hardware events have occurred, as well as predicate indications set based on trigger actions from previous triggered instructions as discussed earlier. Interpretation of the predicates may depend on configuration information stored in a trigger condition/action configuration register 20.

Some examples may support speculative issue of triggered instructions, in which case the instruction checking circuitry 12 includes condition prediction circuitry 30 for predicting whether the trigger conditions for a given triggered instruction will be satisfied. The prediction can be based on prediction state maintained based on outcomes of previous attempts at executing the instructions (e.g. the prediction state may correlate an earlier event or identification of an earlier instruction with an identification of a later set of one or more instructions expected to be executed some time after the earlier event or instruction). If the prediction is incorrect and an instruction is incorrectly issued despite its trigger conditions not turning out to be satisfied, then the effects of the instruction can be reversed (e.g. by flushing the pipeline and resuming processing from a previous correct point of execution).

If multiple ready-to-issue triggered instructions are available, which each are determined or predicted to have their trigger conditions satisfied in the same cycle of selecting a next instruction to issue, the instruction issuing circuitry 12 selects between the ready-to-issue triggered instructions based on a predefined priority order. For example, the priority order may be in a predetermined sequence of the storage locations 60 for the triggered-instruction storage circuitry 11 (with the instructions being allocated to those storage locations 60 in an order corresponding to the order in which the instructions appear in the memory address space from which those instructions are fetched—hence the programmer or compiler may influence the priority order by defining the order in which the instructions appear in memory). Alternatively, explicit priority indications may be assigned to each instruction to indicate their relative priority.

When a triggered instruction is selected for issue, it is sent to the execution circuitry 14 of the processing element (CT), which comprises a number of execution units 15 for executing instructions of different types of classes. For example, execution units 15 could include an adder to perform addition/subtraction operations, a multiplier to perform multiplication operations, etc. Operands for a given operation performed by the execution circuitry 14 can be derived either from input channel data from the input channel data holding storage 18, or from register data read from local register storage 16 of the processing element (or, as mentioned below from further register storage in an input processing block which is accessible based on a register address in the register address space used to access the local register storage 16). Operands can also be derived from count values identified by hardware counters, as will be discussed in more detail below. The result of a given operation performed by the execution circuitry can be output either as output channel data 17 to be output over a given output channel (to the same CT or other CTs, those CTs' associated MTs, or the network on chip) or could be written to a destination register of the local register storage 16 (or to the register storage in the input processing block). In addition to outputting the computational result of the executed instruction, the execution circuitry 14 also updates the machine state 22 based on any trigger action specified by the trigger action information 48 of the executed instruction (e.g. one or more predicate bits may be set or cleared as specified by the trigger action information 48).

Hence, since a triggered instruction specifies the conditions required for its own valid processing and can also perform a computation operation in addition to setting the predicates for controlling subsequent program flow, there is no need for dedicated branch instructions which only control program flow but do not carry out a corresponding computation operation. This helps to increase the compute density (amount of computational workloads achieved per instruction) and hence can improve performance.

Triggered spatial processing elements (PEs) typically have several input (and output) channels where packets of data are fed into it (and fed out of it). The input packets comprise tagged data values 50 having a tag 52 and data 54 as shown in FIG. 3. The tag changes the system conditions, represented as predicate bits, and can therefore result in a specific instruction being triggered, based on the value of the tag. An advantage of the triggered instruction paradigm is how it reacts to incoming data streams efficiently, based on data availability.

However, a key constraint in triggered instruction architectures is the number of instructions that can be stored in the triggered-instruction storage 11 of each PE. The checking of trigger conditions for each triggered instruction in the pool of instructions stored in triggered-instruction storage 11 limits how many instructions can feasibly be stored in a given PE.

The technique discussed in this application provides a mechanism by which sequences of multiple instructions can be executed in response to the condition(s) specified by a single (sequence-start) instruction being met. In the present technique, when a condition specified by a sequence-start instruction is determined (or predicted, if speculation is enabled) to be met, the instruction issuing circuitry 12 is configured to issue the entire sequence of instructions (e.g. in a sequence order). Hence, the entire sequence of instructions can be considered to be associated with the conditions specified by the sequence-start instruction.

According to this approach, the number of instructions whose conditions need to be actively monitored can be reduced, since there is no need to monitor any conditions that may be specified by each of the subsequent instructions in the sequence (e.g. other than the sequence-start instruction). This can allow the subsequent instructions to be stored in different storage to the condition-dependent instructions—for example, in the additional instruction storage circuitry 70 shown in FIG. 4—that is not monitored by the issue circuitry. This can free up space in the triggered-instruction storage for other condition-dependent instructions.

Moreover, since there is no need for conditions associated with the subsequent instructions in the sequence to be monitored, these instructions need not specify condition information or state update information. As a result, it is possible to encode the subsequent instructions using fewer bits than may be required to encode the condition-dependent instructions, as will be discussed below in more detail.

Note that the triggered-instruction storage 10 in FIG. 4 is an example of candidate instruction storage circuitry to store a plurality of condition-dependent instructions, each specifying at least one condition, and the execution circuitry 14 is an example of processing circuitry to execute instructions. The instruction issuing circuitry 12 is an example of issue circuitry to issue the instructions for execution by the processing circuitry, and also includes instruction selection circuitry 74, which is responsible for performing selection process to analyse whether the trigger conditions 40 for the pool of triggered instructions are determined to be satisfied by the machine state 22 and/or based on input channel data availability status of input channel data.

In addition, it is noted that the machine state 22 shown in FIG. 4 also includes sequence state storage circuitry 72 to store sequence state to enable execution of the sequence of instructions to restart after issuing the sequence of instructions is interrupted, as will be discussed in more detail below.

Figure 5:
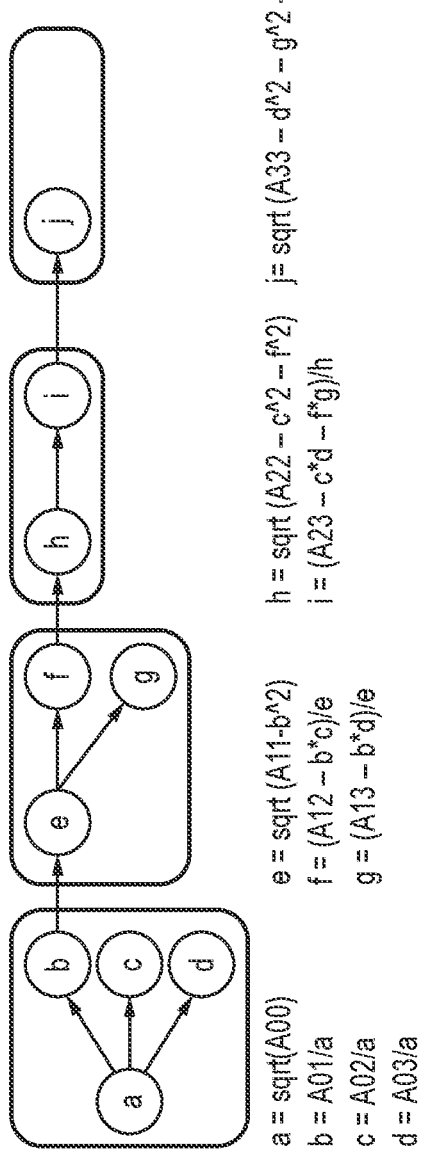
FIG. 5 illustrates an example process for executing a plurality of sequences of instructions.

FIG. 5 illustrates an example in which a sequence-start instruction may be used.

FIG. 5 shows a set of instructions labelled "a" to "j". The arrows connecting pairs of instructions indicate the dependencies of those instructions—for example, instruction e is an instruction to calculate the square root of (A11−b^2), where A11 is an arbitrary value and b is the output of instruction b. Hence, instruction e is dependent on instruction b. Similarly, instruction b calculates the result of an arbitrary value A01 divided by the output of instruction a. Hence, instruction b is dependent on instruction a. These dependencies can be relatively easy to predict—for example, the condition prediction storage discussed above can predict with high confidence that the conditions specified by instruction b will be satisfied once instruction a has been executed, and hence instruction b could be issued once instruction a has issued. Moreover, because these instructions depend directly on one another, the order in which they will be issued can also be predicted with high confidence.

While one might, therefore, expect to achieve performance improvements by speculatively issuing these instructions, the inventors realised that even further improvements could be achieved by treating groups of these instructions as sequences of instructions to be issued one after another in response to issue of a first instruction of the sequence.

For example, each of the blocks a-d, e-g, and h-l are blocks where, if the first instruction in the block executes, the other instructions will also execute, and so the inventors realised that there is no need for a separate condition determination to be made for every instruction in a given block. The programmer/compiler will know what blocks of instructions satisfy this property, and so—according to the present technique—may designate the first instruction in each block as a sequence-start instruction, so that and issue of the sequence-start instruction triggers the entire sequence (e.g. a-b-c-d) to be issued. For example, each of instructions a, e and h could be designated as sequence-start instructions by adding a flag or other information (e.g. this could be information included in the trigger action information (state update information) of the sequence start instruction) to indicate this.

This can be advantageous, because it avoids the need to check whether conditions associated with instructions b, c and d have been (or are predicted to be) met before they are issued. In addition, since conditions associated with these instructions do not need to be checked, it is not necessary for the conditions to be specified in the instructions. This means—as will be discussed below in more detail—that each instruction can take up significantly less space in storage (e.g. in the additional instruction storage discussed above) than other instructions.

Figure 6:
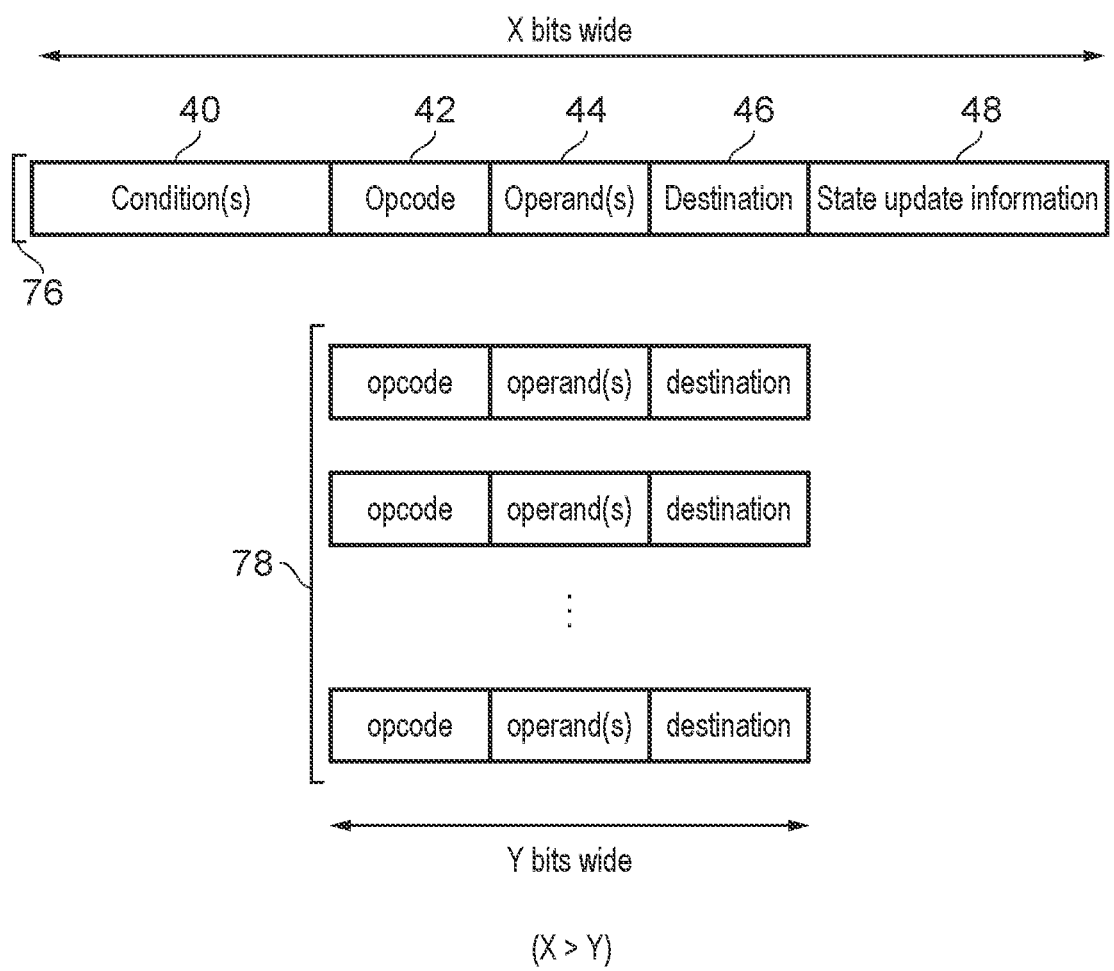
FIG. 6 shows an example of a sequence of instructions comprising a sequence-start instruction followed by a plurality of subsequent instructions.

For example, FIG. 6 shows an example of a condition-dependent instruction 76 (which could, for example, be a sequence-start instruction) and a set 78 of instructions which do not specify condition information or state update information (for example, these could be the subsequent instructions in the sequence, to be issued after the sequence-start instruction is issued). As the figure shows, the size of each of the instructions other than the condition-dependent instruction in the set 78 is smaller (e.g. takes up fewer bits in storage) than the condition-dependent instruction 76 (for example, if the condition-dependent instruction 76 is "X" bits wide, the non-condition-dependent instructions in the set 78 are each "Y" bits wide, where Y<X). As a result, these instructions can take up less space in storage structures.

For example, FIG. 7 shows an example in which two instructions without condition information and state update information can be packed into the same amount of space in the additional instruction storage 70 as is taken up by each condition-dependent instructions in the triggered instruction storage 10. As such, this shows how a greater number of these non-condition-specifying instructions can be stored in the same amount of space as used to store a smaller number of condition-dependent (e.g. condition-specifying) instructions. It will be appreciated, however, that this is just one specific example, which assumes that the number of bits Y in each non-condition-specifying instruction is half or less than half of the number of bits X in each condition-dependent instruction. In other examples, it may not be possible to pack two full non-condition-specifying instructions into the same amount of space as is taken up by each condition-dependent instruction, but the amount of storage space needed to store a given number of non-condition-specifying instructions will still be less than the amount of space needed to store the same number of condition-dependent instructions.

Figure 8:
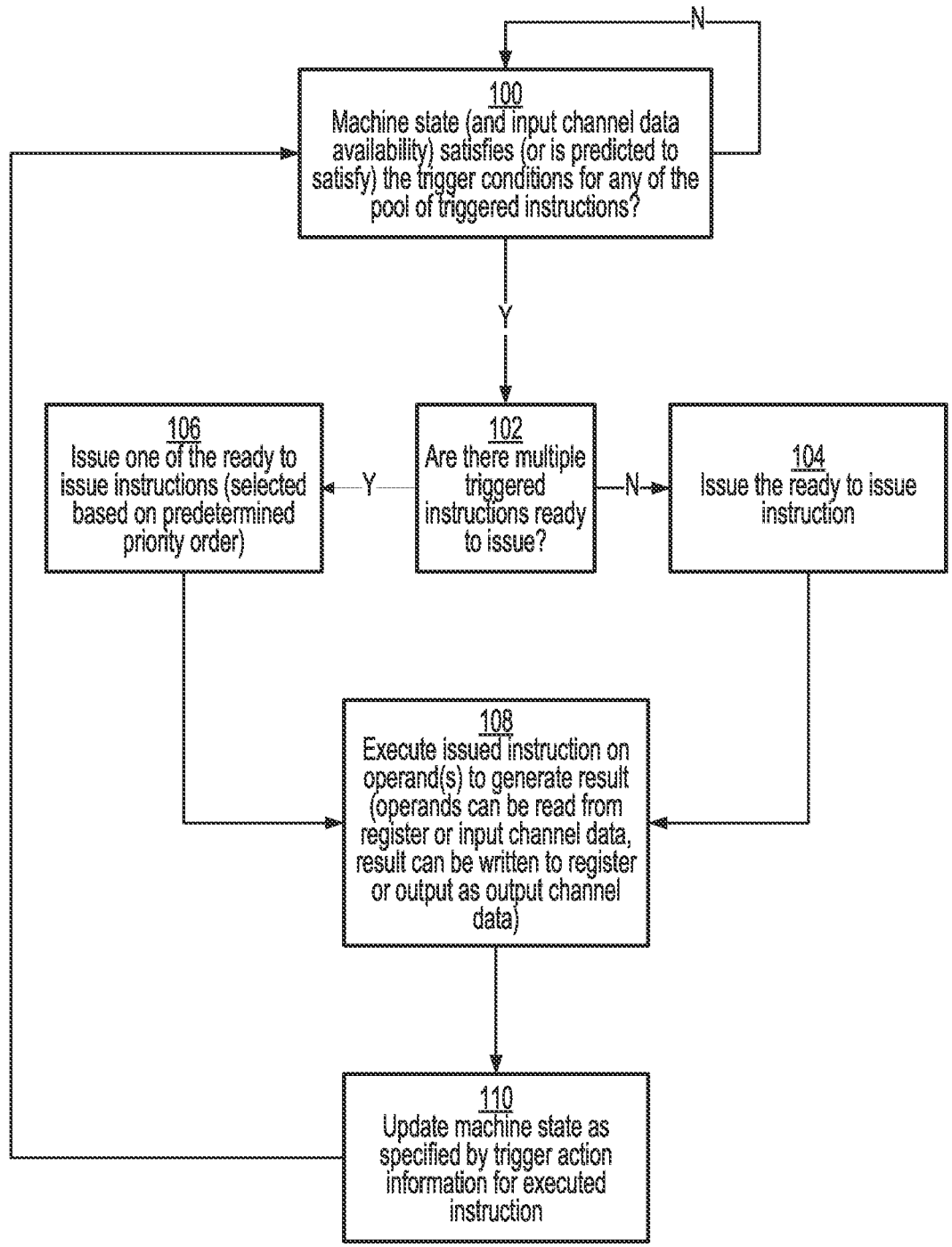
FIG. 8 is a flow diagram illustrating a method of executing instructions in a TIA.

FIG. 8 is a flow diagram illustrating processing of triggered instructions on a triggered-instruction processing element. At step 100, the instruction issuing circuitry 12 of the processing element determines whether the machine state 22 (and input channel data availability, if relevant for any particular instruction) satisfies, or is predicted to satisfy, the trigger conditions for any of the pool of triggered instructions stored in the triggered-instruction storage circuitry 11. If not, then the instruction issuing circuitry 12 waits for a time when an instruction is determined or predicted to satisfy its trigger conditions. If multiple triggered instructions are ready to issue (step 102), then at step 104 the issuing circuitry issues one of the ready to issue instructions which is selected based on a predetermined priority order (e.g. the storage order of the instructions in memory). Otherwise, if there is only one instruction ready to issue, that instruction is issued at step 106. At step 108 the execution circuitry 14 executes the issued instruction on one or more operands to generate a result value. The operands can be read from local registers 16 or from input channel data stored in the input channel data holding area 18, or can be dequeued data which is dequeued from one of the input data buffers managed by the input channel processing circuitry 70. The result value can be written to a local register 16, output as output channel data, or enqueued onto one of the buffers managed by the input channel processing circuitry 70. At step 110, the execution circuitry 16 also triggers an update to the machine state 22 based on the trigger action information 48 specified by the executed instruction.

Figure 9:
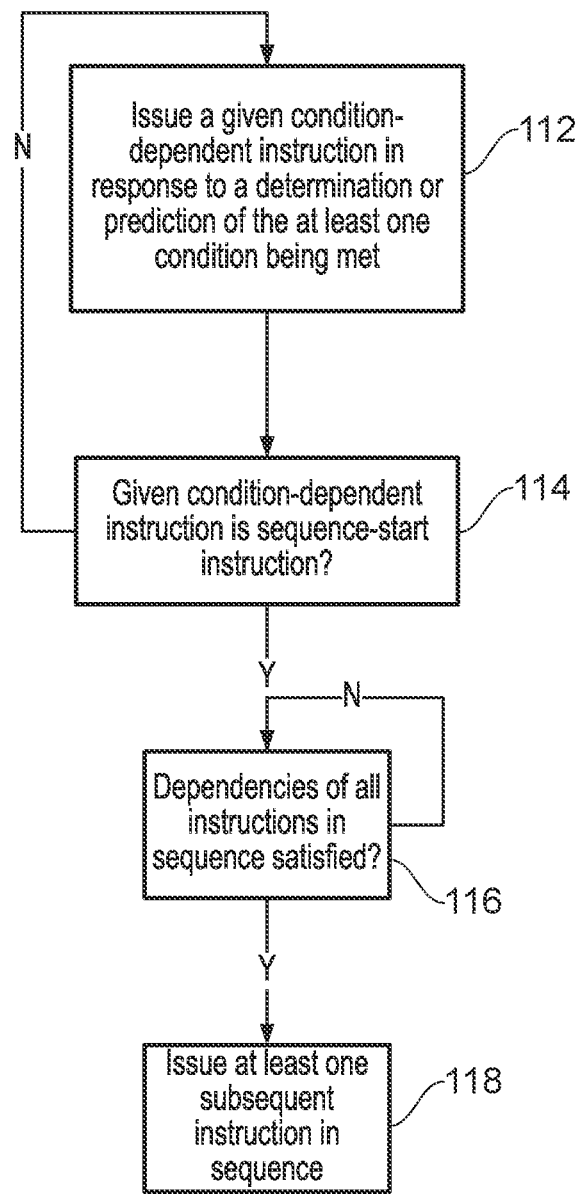
FIG. 9 is a flow diagram illustrating a method of issuing condition-dependent instructions.

FIG. 9 is a flow diagram illustrating issuing of a sequence of instructions including a sequence-start instruction and at least one subsequent instruction. At step 112, a given condition-dependent instruction is issued in response to a determination or prediction of its trigger conditions (e.g. the at least one condition it specifies) being met. It is then determined 114 whether the given condition-dependent instruction is a sequence-start instruction, and if it is, it is determined 116 whether the dependencies of each of the instructions in the sequence are satisfied (for example, even if the at least one subsequent instruction does not specify at least one condition that depends on the machine state 22, it might still have conditions (which may be implicit from the source and/or destination operands specified) relating to input channel availability). Once the dependencies of all of the instructions in the sequence (i.e. the sequence-start instructions (whose conditions should have been met already, in order for it to be issued) and each subsequent instruction), the one or more subsequent instructions in the sequence are issued 118.

Figure 10:
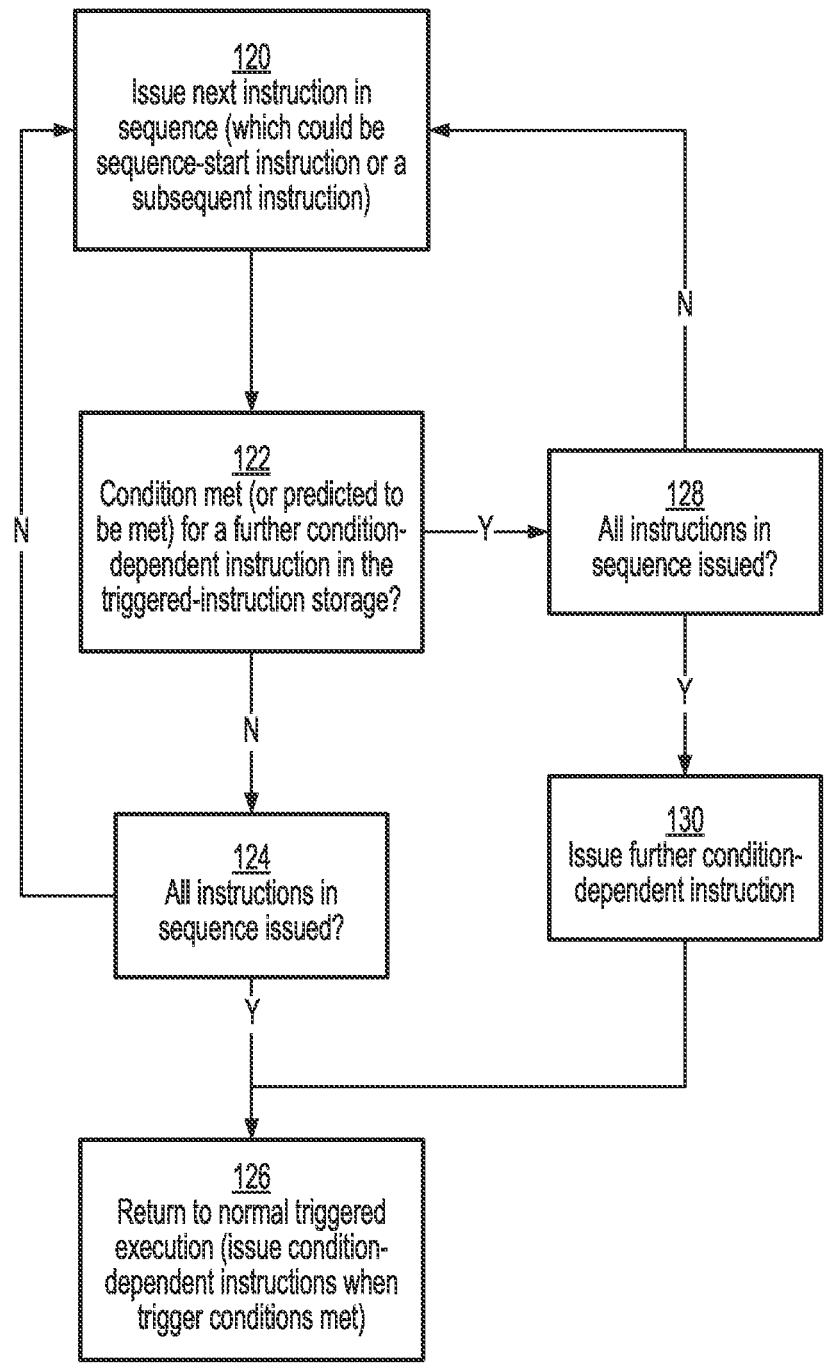
FIGS. 10 to 12 are flow diagrams illustrating steps that can be taken in response to determining that a condition specified by a further instruction has been met.
Figure 11:
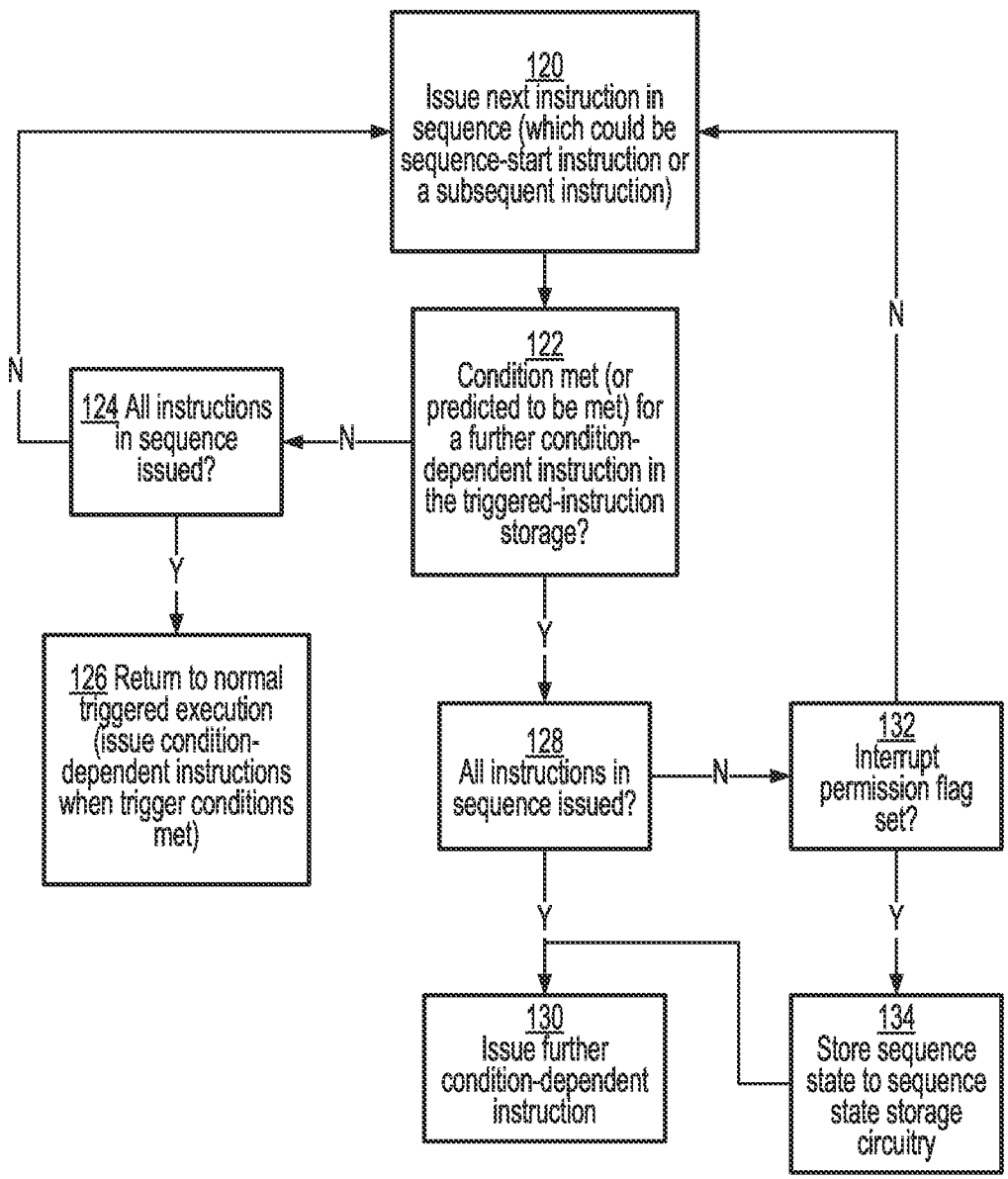
Figure 12:
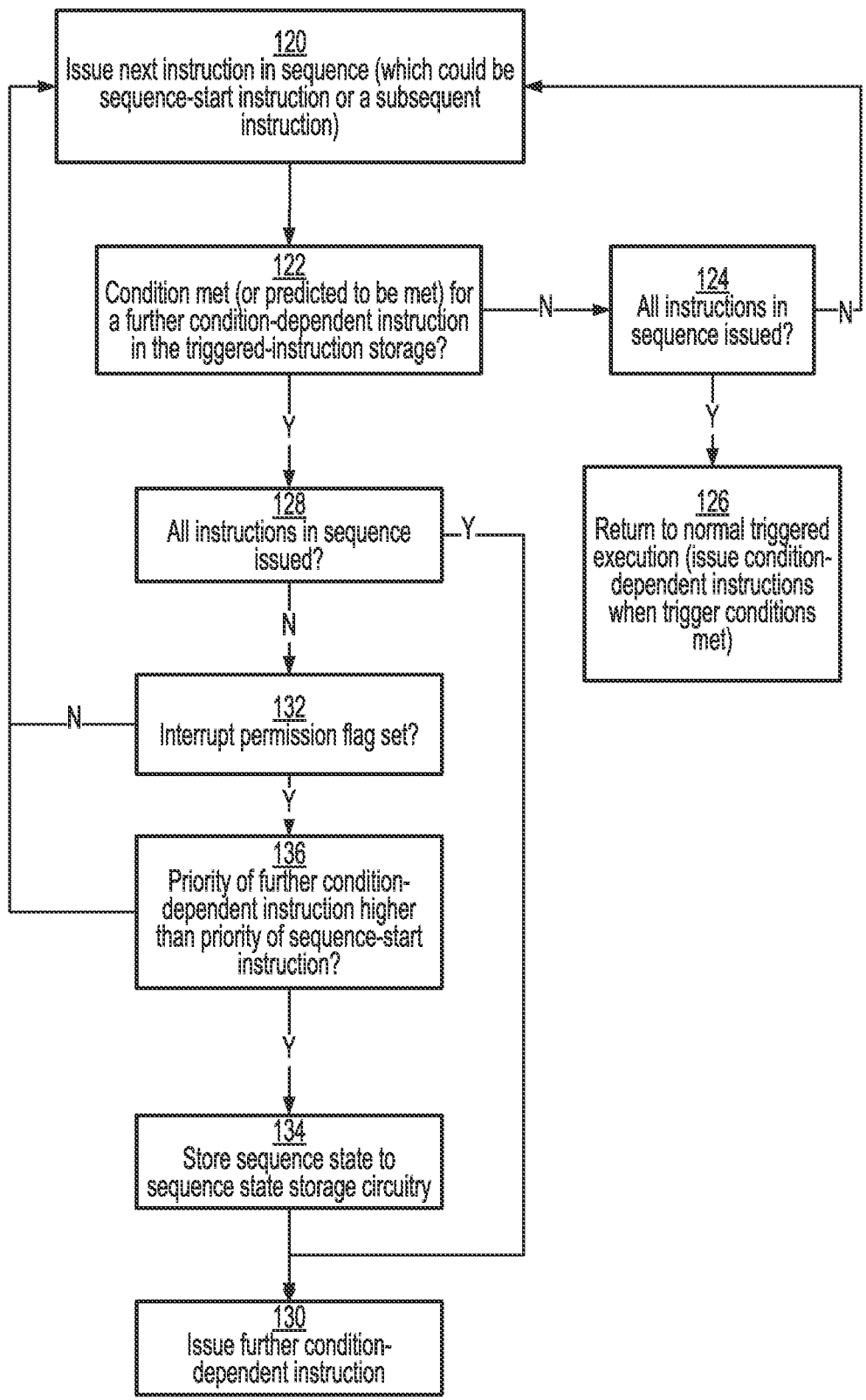

FIGS. 10-12 are flow diagrams illustrating examples of how the issue circuitry may respond to a determination or prediction that conditions satisfied by a further condition-dependent instruction are met between issue of the sequence-start instruction and issue of the last instruction in the sequence.

In the example shown in FIG. 10, a next instruction in the sequence (e.g. the sequence-start instruction or a subsequent instruction in the sequence) is issued 120. At step 122, it is determined whether a condition specified by a further condition-dependent instruction (e.g. not part of the sequence) is determined or predicted to be met. If not, it is determined 124 whether all of the instructions in the sequence have been issued, and the method either returns to step 120 (issuing the next instruction in the sequence) if it is determined that not all instructions in the sequence have been issued or, if all of the instructions in the sequence have been issued, proceeds to a step 126 of returning to normal triggered instruction execution (e.g. issuing condition-dependent instructions in response to their conditions being determined or predicted to be met).

Returning to step 122, if the conditions for a further condition-dependent instruction are determined or predicted to be met at this step, it is determined 128 whether all of the instructions in the sequence have been issued. If they have not all been issued, the method returns to step 120 and the next instruction in the sequence is issued. If, on the other hand, all the instructions in the sequence have been issued, the further condition-dependent instruction is issued 130 before the method proceeds to step 126.

Hence, in the example shown in FIG. 10, issuing the sequence of instructions is not permitted to be interrupted, and hence any further condition-dependent instructions cannot be issued until all instructions in the sequence have been issued.

FIG. 11 shows another approach to dealing with interruptions when issuing the sequence of instructions. In this example, steps 120, 122, 124, 126 and 128 proceed as in FIG. 10. However, unlike in FIG. 10, this method includes a step 132 of determining, when it is determined in step 128 that not all of the instructions in the sequence have been issued, whether an interrupt permission flag was set in the sequence-start instruction. The interrupt permission flag may be set in the sequence-start instruction to indicate that the issue circuitry is permitted to interrupt issuing of the sequence of instructions in order to issue a further condition-dependent instruction whose conditions have been met. Hence, if it is determined that the interrupt permission flag has not been set, the method returns to step 120 and the next instruction in the sequence is issued. On the other hand, if it is determined 132 that the interrupt permission flag has been set in the sequence-start instruction, sequence state (e.g. information allowing issue of the sequence of instructions to resume or restart after the interruption has been dealt with) is stored to sequence state storage circuitry, before the further condition-dependent instruction is issued 130. Once this further condition-dependent instruction has been issued, issue of the instructions in the sequence can either restart or resume, or the apparatus can return to normal triggered-instruction execution (for instance, this could depend on information stored in the sequence state storage circuitry and/or in configuration registers).

Hence, in the example of FIG. 11, issuing of the sequence of instructions is permitted to be interrupted, provided that an interrupt permission flag is set in the sequence start instruction.

Note that, while the discussion above assumes that the interrupt permission flag (an example of interrupt permission information) is set in the sequence-start instruction itself, it could alternatively be set elsewhere, such as in a register referenced by the sequence-start instruction.

FIG. 12 shows another approach. The method of FIG. 12 is the same as that of FIG. 11, except that an additional step 136 is performed after determining 132 that the interrupt permission flag has been set. In this step, it is determined whether a priority associated with the further condition-dependent instruction is higher than a priority associated with the sequence-start instruction. For example, the priority order could be explicitly recorded in the instructions or in registers identified by the instructions, or it could be implicit from—for example—the order of the instructions in memory or in the candidate instruction storage circuitry.

If it is determined, in step 136, that the priority of the further condition-dependent instruction is higher than the priority of the sequence-start instruction, the sequence state is stored 134 and the further condition-dependent instruction is issued, as in FIG. 11. On the other hand, if the priority of the sequence-start instruction is determined to be higher than the priority of the further condition-dependent instruction, the method returns to step 120 and the next instruction in the sequence is issued.

Hence, in FIG. 12, interruption of issue of the sequence of instructions in order to issue a further condition-dependent instruction is not permitted unless the interrupt permission flag is set and a priority associated with the further condition-dependent instruction is higher than a priority associated with the sequence-start instruction.

Triggered Instructions Overview

In a triggered instruction architecture, each instruction has a set of conditions under which it is issued ("triggered"); there is no program counter.

Conditions are monitored, and if the system state (e.g. predicates and hardware events) match the state defined in the conditions, then the instruction is issued ("triggered"). This approach limits the number of instructions which can be supported in each processing element (PE), due to the need to monitor the instructions. However, this limitation can be acceptable (though still limiting) in a spatial fabric (e.g. a spatial architecture) as each PE is dedicated to a small part of the program pipeline.

A key advantage of this approach is that the instruction fetch, decode and issue logic is much simpler than a normal CPU and more transistors (and therefore area and power budget) can be dedicated to the datapath, increasing the compute density.

Moreover, by eliminating branches:
1. The number of control-flow instructions is reduced
2. The PE can react quickly to incoming data (the incoming data "triggers" the appropriate instructions)

Management of Control Flow in Triggered PE

Each instruction contains a "trigger" portion (e.g. the trigger condition information or condition field described above) specifying what conditions of the PE state leads to it being issued ("triggered"). The PE state consists of a set software-set predicate bits and hardware-driven event signals (e.g. "input channel A is full"), as well the "tag" bits of data packets received at head of the input channel buffers.

Every instruction can set or clear specific predicate bits (e.g. to update the machine state) when issued. Moreover, the destination of an instruction can be the predicate bits, meaning that an instruction could set the predicate bits based on the results of a calculation; this is how the equivalent of a conditional branch is implemented.

There may be a priority associated with each of the instructions, and this priority can be based on the order of the instructions. For example, if two instructions can be triggered at the same time, one gets priority over the other if it is specified first in the instruction memory.

Pipelined Triggered Instruction PEs

One might consider implementing a Triggered-Instruction PE with several pipelining configurations, including an unpipelined design. In order to achieve higher clock frequencies in a particular technology implementation, and to support more complex execution units (e.g. floating point units) pipelined stages can be introduced in the processing circuitry provided within a TIA.

One might, for example, consider splitting the trigger stage, decode stage and execute stage (which can be one or two stages). However, the unpipelined approach has proved to be better than the pipelined approaches without any speculation features. This is because, without speculation, an instruction cannot be triggered until the predicates for the previous instruction are known. The predicates can be updated when an instruction is issued, and through the datapath. Moreover, the state of an input channel (which the current instruction may dequeue) and output channel (which the current instruction my enqueue) may need to be considered when determining whether to issue an instruction. Hence, because the currently executing instruction may change the state of these queues, it can mean that the next instruction cannot be triggered due to the fact that the current queue states may be altered by in-flight instructions. The system therefore either waits for the previous instruction to complete and update the predicate bits and queue status before issuing a next instruction, or speculates the upcoming queue and register status.

To address this, a condition prediction unit can be implemented that predicts the value of a predicate before a current instruction has finished executing, so that the next instruction can be speculatively triggered. A queue status accounting approach can also be implemented, to determine whether instructions can be speculated—for example, each queue may expose its occupancy, and it can be determined whether this value is less than the number of in-flight instructions. Furthermore, the tag of input channels N places behind the head can be made accessible to peak at before the head is dequeued by an in-flight instruction. The queue status accounting approach may be conservative.

The incorporation of the predicate prediction and queue status accounting increases performance significantly, to the point where some pipelined approaches outperform the single-cycle implementation. However, their execution unit is relatively simple; if more complex operations were considered, such as vector, reduce, floating point, compression etc., then the execution unit complexity and size would increase, significantly increasing the delay, changing the system balance and requiring the execution stage to be split into more stages.

A lack of support for nested speculation can be too limiting in this case.

Fundamental Problems with Triggered Instructions

The inventors considered several key fundamental sources of inefficiency in pipeline triggered-instruction architectures:

1. The predicates and hardware-events are speculated for every instruction, not just branch instructions. This is because a condition-dependent instruction cannot be triggered before the predicates and hardware events are known.
2. Most fields of the instruction are used in determining whether it should be executed (e.g. instructions can read from input channels and write to output channels and the status of these must be determined before triggering). This makes instruction decode complex and means the instructions tend to be implemented in register flops instead of more efficient technologies (such as SRAM).
3. Often, many PEs are doing the same, or similar, jobs on different data, and therefore each have identical instructions inside them, which can be inefficient.
4. Tags on input channel queues are monitored with the instruction triggers, which adds significant circuit complexity. In pipelined designs, previous values of these tags are also "peaked" in order to speculate the next instruction, further increasing complexity.
5. The number of instructions in each PE is limited due to monitoring of triggers (as discussed above).
6. Lower code density since, each instruction specifies trigger (condition) bits and predicate (state update) bits.

Triggered Branches

A fundamental source of inefficiency in a TIA is that the next instruction to be issued is rarely known in advance, which contrasts with a traditional CPU with a program counter, in which the next instruction is always known, except in a branch instruction.

The present technique proposes a solution to this problem, which involves a triggered-branch processing element as opposed to a triggered-instruction processing element, where a "branch" in this instance is a sequence of one or more sequential instructions (e.g. including the sequence-start instruction and at least one subsequent instruction) that are triggered, as opposed to a single instruction being triggered each time. In this solution, each of the triggerable instructions can optionally specify another instruction to unconditionally issued after that instruction. Each subsequent instruction in the sequence may then have a flag to indicate whether or not it is followed by another unconditional instruction.

This approach maintains the triggering mechanisms of a TIA, to react to data availability, and maintains a simple fetch and decode mechanism.

The first instruction of the sequence (the sequence-start instruction) is held in memory close to the trigger (for example, it might be in flops), and it contains a pointer to the second instruction of the sequence, and this sequence may be stored in SRAM (alleviating 2), and be accessible from memory shared between several PEs (alleviating 3). The sequence is executed without triggers being considered, one-after-another.

If part of the sequence uses the result of a previous operation, it is up to the programmer/compiler to either pad with NOPs or instead use different triggered branch that processes the result. It may be beneficial to pad with NOPs rather than start a new triggered branch. This depends on the situation. Relying on programmer/compiler inserted NOPs significantly reduces PE complexity.

Some embodiments may enable the sequence-start instruction to specify whether the sequence can be interrupted if another branch can be triggered (and this can depend on the priority of the triggered branch, based on its order). Some embodiments may also have a single-bit flag in the instruction to prevent speculative execution.

The solution may be utilised in some embodiments with multiple issues and varying pipeline lengths:
1. The commit order of consecutively triggered instructions must be ensured in hardware.
2. On sequential sequences, order does not have to be maintained, programmer/compiler must insert NOPs to ensure dependencies are respected.

In other words, sequence of instructions can be employed to take better advantage (through greater control) of multiple issue widths.

Advantages
1. Higher performance since sequential instructions can be executed without speculation (and hence no penalties of mis-speculation) and the next instruction fetched in advance.
    a. Spec/Commit buffers etc. handle multiple stages in the execute stage (with the limit that commit ordering is constrained to match issue), but not the cycle between trigger and decode.
    b. The instructions can skip the trigger stage and be prefetched without speculation or error.
2. Reduces the limit of low number of instructions (limited by number of triggers).
3. Sequenced instructions (except first of sequences) can be kept in SRAM and/or shared between multiple PEs.
4. Caches may or may not be used.
5. Compiler optimisation of multi-issue (complexity moved to compiler) (currently, commit ordering is constrained to be preserved in consecutive trigger instructions).
6. The footprint of each subsequent instruction in the sequence instruction can be smaller, since they do not need to specify the predicate and trigger.

Hardware Counters

The present technique further reduces manual control flow overhead through introducing hardware-driven trigger event signals controlled through configurable and instruction controllable counters. These overheads result from not requiring instructions for managing control flow, for example, instructions to increment software and test counters and updating the predicate bits (conditional branching). Moreover, since the number of instructions stored in each PE is limited, not requiring these extra control flow managing instructions is a key benefit. For example, when programs are statically programmed, the hardware counters can be configured to manage run-time control flow, therefore reducing the operations required at run-time for control-flow management. This enables complex data read and write patterns as well and program looping and repetition without software overhead.

In addition to hardware-control flow, the counter values can be used directly for addressing values in the register file or memory which may be used in data transformations. For example, to access every other register file element.

The counters can be advanced by any instruction through dedicated fields in the instruction format. Any instruction can advance any counter. In some implementations, the ability to advance multiple (e.g. all) counters may be provided, while in other implementations one may choose to reduce the number of bits required in the instruction format and only allow one or a subset of counters to be advanced simultaneously.

Whether each counter has a dedicated bit in the instruction to enable one instruction to increment/decrement multiple counters, or whether the bits in the instruction are decoded to select none or one counter, reducing the number of bits required in the instruction, is an implementation detail that depends on the embodiment.

Note that what an "advance" entails depends on the configuration of that specific counter (e.g. increment by 1, decrement by 5 etc.), which can be set when a program is loaded, before execution begins.

Instructions can be triggered on counter events (such as an overflow). Some embodiments may add other events, such as the modulo which can be set to be asserted every, 2, 4, 8, etc. increments, for example. In practice some embodiments may not expose all hardware event signals as hardware predicates but have a multiplexer set of configuration time that selects a subset of possible hardware event signals propagated for use as hardware-set predicate bits. This approach reduces circuit complexity and area. Moreover, the configuration time paths may have a multi-cycle path delay, reducing the circuit overhead.

Figure 13:
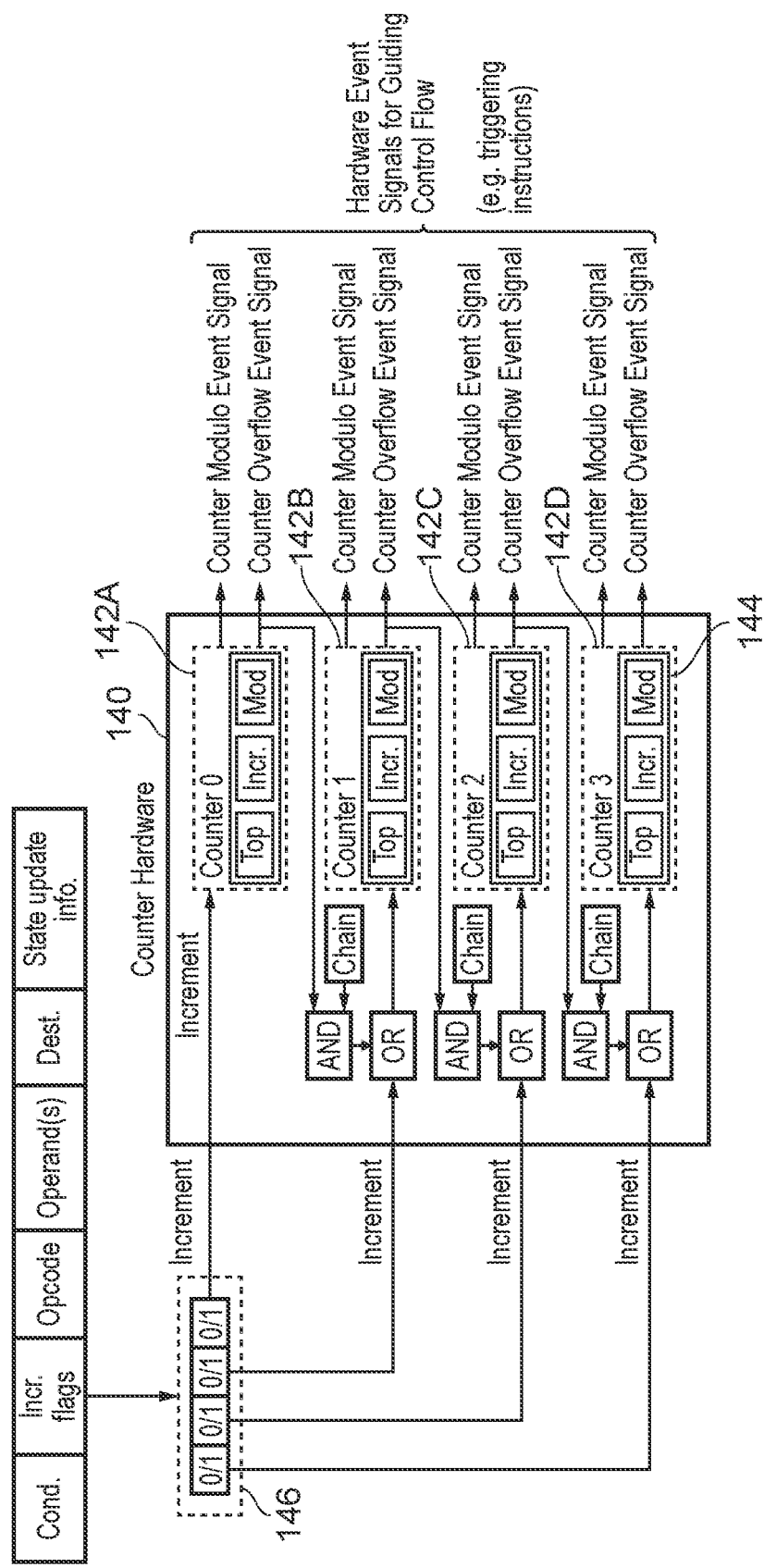
FIG. 13 illustrates hardware counters.

At hardware configuration time the counters are configured. FIG. 13 illustrates an example embodiment in which counter hardware (also referred to as counter circuitry) 140 is provided which maintains four hardware counters 142. Configuration storage circuitry 144 is also provided for each counter, to store:

- a "Top" top value, which is the value at which to wraparound to zero (if incrementing—the top is the value to which the counter wraps around from zero, when decrementing) and exert an "overflow" event that can be used to trigger instructions;
- an "Incr" bit, which indicates whether the counter increments or decrements—the "Incr" field is also used to set a custom value by which to increment or decrement each time;
- a "Mod" (modulo) field, which enables a secondary event signal to be asserted based on the output of an individual counter register (every 2, 4, 8, 16, etc. counts, regardless of the "Top");

Each of these values is configured at hardware configuration time. Moreover, in some examples, the "count" value itself may be configurable, e.g. enabling the software to start at a value other than zero after configuration.

Additionally, each counter can optionally be configured to increment an adjacent counter upon overflow, enabling counters to be chained together. This has many applications, including handling of data structures with multiple dimensions.

Note that in some examples an overflow may be defined as the first value of the count, while in others it may be defined as "the last value before an overflow" (e.g. full).

In some examples, the count value itself may be exposed to software, enabling it to be read (e.g. in a source field) or written to (e.g. in the destination field) from software.

In some examples, current count values may be used to address registers, for example as a base or index in a base+index addressing scheme.

In some examples, the counters' settings may be specified in control registers. In some examples, it may be possible to clear counters, and this may be achieved by exposing a clear signal through a software writable address, or having a dedicated instruction for handling this.

FIG. 13 shows an example of how "increment flags" in an instruction may trigger one or more counters to be incremented. In this particular example, each instruction has a four-bit increment field 146, in which each bit corresponds to a different one of the counters—in particular the rightmost bit in this example corresponds to counter 0, the next bit along corresponds to counter 1, and so on. When any of these bits is set (e.g. to one), this causes the corresponding counter to be advanced, according to the Incr value in the counter configuration storage 144. However, it will be appreciated that in some embodiments a counter will be advanced when the corresponding bit is cleared to zero (and not when the bit is set to 1).

Note that, although the arrows from the increment flags field to the counters is labelled "increment" in FIG. 13, it will be appreciated that this whether the counter is incremented or decremented will depend on the Incr value for that counter, as discussed above.

Figure 14:
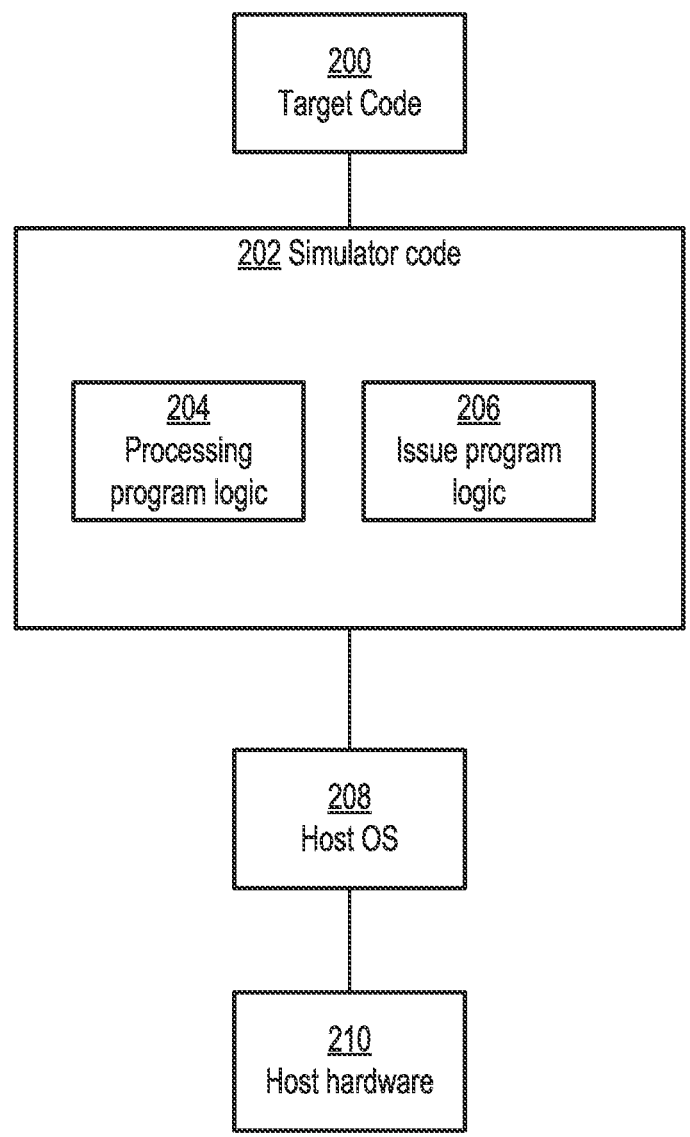
FIG. 14 illustrates a virtual machine implementation.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 210, optionally running a host operating system 208, supporting the simulator program 202. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 210), some simulated embodiments may make use of the host hardware, where suitable.

The simulator program 202 may be stored on a computer-readable storage medium (which may be a non-transitory medium), and provides a program interface (instruction execution environment) to the target code 200 (which may include applications, operating systems and a hypervisor) which is the same as the interface of the hardware architecture being modelled by the simulator program 202. Thus, the program instructions of the target code 200, including condition-dependent instructions, such as the sequence-start instruction described above, and also including the at least one subsequent instruction as described above, may be executed from within the instruction execution environment using the simulator program 202, so that a host computer 210 which does not actually have the hardware features of the apparatus discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Further, the words "comprising at least one of . . . " in the present application are used to mean that any one of the following options or any combination of the following options is included. For example, "at least one of: A; B and C" is intended to mean A or B or C or any combination of A, B and C (e.g. A and B or A and C or B and C).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present technique include:

(1) An apparatus comprising:
processing circuitry to execute instructions;
issue circuitry to issue the instructions for execution by the processing circuitry; and
candidate instruction storage circuitry to store a plurality of condition-dependent instructions, each specifying at least one condition,
wherein:
the issue circuitry is configured to issue a given condition-dependent instruction in response to a determination or a prediction of the at least one condition specified by the given condition-dependent instruction being met; and
when the given condition-dependent instruction is a sequence-start instruction, the issue circuitry is responsive to the determination or prediction to issue a sequence of instructions comprising the sequence-start instruction and at least one subsequent instruction.

(2) The apparatus of (1), wherein:
the plurality of condition-dependent instructions comprise a pool of candidate condition-dependent instructions; and
the issue circuitry comprises instruction selection circuitry to perform a selection process to:
determine whether the at least one condition specified by any of the condition-dependent instructions in the pool of candidate condition-dependent instructions has been or is predicted to have been met; and
select, in dependence on whether the at least one condition specified by any of the condition-dependent instructions in the pool of candidate condition-dependent instructions has been or is predicted to have been met, a next instruction to issue, the next instruction being selected from the pool of candidate condition-dependent instructions.

(3) The apparatus of (1) or (2), wherein
an encoding of the at least one subsequent instruction excludes a condition field indicating the at least one condition.

(4) The apparatus of any preceding clause, wherein:
each condition-dependent instruction specifies state update information indicative of a state update for use in evaluating whether the at least one condition specified by one or more of the plurality of condition-dependent instructions has been met; and
an encoding of the at least one subsequent instruction excludes a state update field indicating the state update information.

(5) The apparatus of any preceding clause, wherein
the sequence-start instruction specifies information indicative of a location at which one or more of the at least one subsequent instruction is stored.

(6) The apparatus of any preceding clause, wherein
a number of bits in each of the at least one subsequent instruction is less than a number of bits in each of the plurality of condition-dependent instructions.

(7) The apparatus of any preceding clause, wherein
the issue circuitry is configured to suppress interrupting issuing the sequence of instructions by issuing a further condition-dependent instruction before all of the instructions in the sequence have been issued.

(8) The apparatus of any of (1) to (6), wherein
the issue circuitry is responsive to interrupt permission information specified by the sequence-start instruction to determine whether it is permitted to interrupt issuing the sequence of instructions to issue a further condition-dependent instruction before all of the instructions in the sequence have been issued.

(9) The apparatus of (8), wherein
the issue circuitry is configured, in response to determining that it is permitted to interrupt issuing the sequence of instructions, to determine, based on an instruction priority order associated with the sequence-start instruction and the further condition-dependent instruction, whether to interrupt issuing the sequence of instructions by issuing the further condition-dependent instruction.

(10) The apparatus of (8) or (9), comprising
sequence state storage circuitry to store sequence state to enable execution of the sequence of instructions to restart after issuing the sequence of instructions is interrupted.

(11) The apparatus of any preceding clause, wherein
the issue circuitry comprises condition prediction circuitry to suppress, in response to a speculation suppression indication identified by the sequence-start instruction, speculation of whether the at least one condition specified by the sequence-start instruction has been met.

(12) The apparatus of any preceding clause, wherein
the issue circuitry is configured to control a timing of issuing the sequence-start instruction based on analysis of dependencies specified by one or more of the at least one subsequent instruction.

(13) The apparatus of any preceding clause, comprising
counter circuitry to maintain one or more hardware counters,
wherein when an instruction specifies a counter-advance indication in addition to identifying a data processing operation to be performed, the processing circuitry is responsive to the counter-advance indication to issue a counter advance signal to trigger the counter circuitry to advance a count value of at least one of the one or more hardware counters.

(14) The apparatus of (13), wherein
for at least one encoding of condition information indicating the at least one condition specified by the plurality of condition-dependent instructions, the issue circuitry is configured to determine whether the at least one condition is met depending on whether a counter event has occurred for a given hardware counter maintained by the counter circuitry.

(15). The apparatus of (14), wherein
the counter event comprises a detection of at least one of:
an overflow signal asserted by the counter circuitry in response to an overflow event; and
a secondary event signal asserted by the counter circuitry in response to the count value being advanced to a predetermined value.
(16). The apparatus of any of (13) to (15), wherein
the processing circuitry is responsive to at least one encoding of an instruction to use the count value as an operand or to calculate a register identifier to identify a source register or a destination register.
(17). The apparatus of any of (13) to (16), comprising
configuration data storage circuitry to store counter configuration information associated with the counter circuitry,
wherein:
the counter circuitry is responsive to the counter advance signal to determine an updated count value; and
the counter configuration information is indicative of at least one of:
an advancement amount to be applied to the count value; and
a top count value at which to wrap-around.
(18) The apparatus of any of (13) to (17), wherein:
the counter circuitry is configured to maintain a plurality of hardware counters; and
when a chain overflow indication associated with a first hardware counter and a second hardware counter is set, the counter circuitry is responsive to a counter overflow event associated with the first hardware counter to advance the second hardware counter.
(19). A method comprising:
issuing instructions for execution by processing circuitry;
storing a plurality of condition-dependent instructions, each specifying at least one condition,
issuing a given condition-dependent instruction in response to a determination or a prediction of the at least one condition specified by the given condition-dependent instruction being met; and
when the given condition-dependent instruction is a sequence-start instruction, issuing, in response to the determination or the prediction, a sequence of instructions comprising the sequence-start instruction and at least one subsequent instruction.
(20). A computer program comprising instructions which, when executed on a computer, control the computer to provide:
processing program logic to execute instructions;
issue program logic to issue the instructions for execution by the processing circuitry; and
a candidate instruction storage structure to store a plurality of condition-dependent instructions, each specifying at least one condition,
wherein:
the issue program logic is configured to issue a given condition-dependent instruction in response to a determination or a prediction of the at least one condition specified by the given condition-dependent instruction being met; and
when the given condition-dependent instruction is a sequence-start instruction, the issue program logic is responsive to the determination or prediction to issue a sequence of instructions comprising the sequence-start instruction and at least one subsequent instruction.
(21) A computer-readable storage medium storing the computer program of clause 20.

We claim:
1. An apparatus comprising:
processing circuitry to execute instructions;
issue circuitry to issue the instructions for execution by the processing circuitry; and
candidate instruction storage circuitry to store a plurality of condition-dependent instructions, each specifying at least one condition,
wherein:
the issue circuitry is configured to issue a given condition-dependent instruction in response to a determination or a prediction of the at least one condition specified by the given condition-dependent instruction being met; and
when the given condition-dependent instruction is a sequence-start instruction, the issue circuitry is responsive to the determination or prediction to issue a sequence of instructions comprising the sequence-start instruction and at least one subsequent instruction.
2. The apparatus of claim 1, wherein:
the plurality of condition-dependent instructions comprise a pool of candidate condition-dependent instructions; and
the issue circuitry comprises instruction selection circuitry to perform a selection process to:
determine whether the at least one condition specified by any of the condition-dependent instructions in the pool of candidate condition-dependent instructions has been or is predicted to have been met; and
select, in dependence on whether the at least one condition specified by any of the condition-dependent instructions in the pool of candidate condition-dependent instructions has been or is predicted to have been met, a next instruction to issue, the next instruction being selected from the pool of candidate condition-dependent instructions.
3. The apparatus of claim 1, wherein
an encoding of the at least one subsequent instruction excludes a condition field indicating the at least one condition.
4. The apparatus of claim 1, wherein:
each condition-dependent instruction specifies state update information indicative of a state update for use in evaluating whether the at least one condition specified by one or more of the plurality of condition-dependent instructions has been met; and
an encoding of the at least one subsequent instruction excludes a state update field indicating the state update information.
5. The apparatus of claim 1, wherein
the sequence-start instruction specifies information indicative of a location at which one or more of the at least one subsequent instruction is stored.
6. The apparatus of claim 1, wherein
a number of bits in each of the at least one subsequent instruction is less than a number of bits in each of the plurality of condition-dependent instructions.
7. The apparatus of claim 1, wherein
the issue circuitry is configured to suppress interrupting issuing the sequence of instructions by issuing a further condition-dependent instruction before all of the instructions in the sequence have been issued.
8. The apparatus of claim 1, wherein
the issue circuitry is responsive to interrupt permission information specified by the sequence-start instruction to determine whether it is permitted to interrupt issuing the sequence of instructions to issue a further condi- tion-dependent instruction before all of the instructions in the sequence have been issued.

9. The apparatus of claim 8, wherein
the issue circuitry is configured, in response to determining that it is permitted to interrupt issuing the sequence of instructions, to determine, based on an instruction priority order associated with the sequence-start instruction and the further condition-dependent instruction, whether to interrupt issuing the sequence of instructions by issuing the further condition-dependent instruction.

10. The apparatus of claim 8, comprising
sequence state storage circuitry to store sequence state to enable execution of the sequence of instructions to restart after issuing the sequence of instructions is interrupted.

11. The apparatus of claim 1, wherein
the issue circuitry comprises condition prediction circuitry to suppress, in response to a speculation suppression indication identified by the sequence-start instruction, speculation of whether the at least one condition specified by the sequence-start instruction has been met.

12. The apparatus of claim 1, wherein
the issue circuitry is configured to control a timing of issuing the sequence-start instruction based on analysis of dependencies specified by one or more of the at least one subsequent instruction.

13. The apparatus of claim 1, comprising
counter circuitry to maintain one or more hardware counters,
wherein when an instruction specifies a counter-advance indication in addition to identifying a data processing operation to be performed, the processing circuitry is responsive to the counter-advance indication to issue a counter advance signal to trigger the counter circuitry to advance a count value of at least one of the one or more hardware counters.

14. The apparatus of claim 13, wherein
for at least one encoding of condition information indicating the at least one condition specified by each of the plurality of condition-dependent instructions, the issue circuitry is configured to determine whether the at least one condition is met depending on whether a counter event has occurred for a given hardware counter maintained by the counter circuitry.

15. The apparatus of claim 14, wherein
the counter event comprises a detection of at least one of:
an overflow signal asserted by the counter circuitry in response to an overflow event; and
a secondary event signal asserted by the counter circuitry in response to the count value being advanced to a predetermined value.

16. The apparatus of claim 13, wherein
the processing circuitry is responsive to at least one encoding of an instruction to use the count value as an operand or to calculate a register identifier to identify a source register or a destination register.

17. The apparatus of claim 13, comprising
configuration data storage circuitry to store counter configuration information associated with the counter circuitry,
wherein:
the counter circuitry is responsive to the counter advance signal to determine an updated count value based on the counter configuration information; and
the counter configuration information is indicative of at least one of:
an advancement amount to be applied to the count value; and
a top count value of the counter.

18. The apparatus of claim 13, wherein:
the counter circuitry is configured to maintain a plurality of hardware counters; and
when a chain overflow indication associated with a first hardware counter and a second hardware counter is set, the counter circuitry is responsive to a counter overflow event associated with the first hardware counter to advance the second hardware counter.

19. A method comprising:
issuing instructions for execution by processing circuitry;
storing a plurality of condition-dependent instructions, each specifying at least one condition,
issuing a given condition-dependent instruction in response to a determination or a prediction of the at least one condition specified by the given condition-dependent instruction being met; and
in response to the given condition-dependent instruction being a sequence-start instruction, issuing, in response to the determination or the prediction, a sequence of instructions comprising the sequence-start instruction and at least one subsequent instruction.

20. A non-transitory computer-readable storage medium storing a computer program comprising instructions which, when executed on a computer, control the computer to provide:
processing program logic to execute instructions; and
issue program logic to issue instructions for execution by the processing program logic;
wherein:
the issue program logic is configured to issue a given condition-dependent instruction of a plurality of candidate condition-dependent instructions, each specifying at least one condition, in response to a determination or a prediction of the at least one condition specified by the given condition-dependent instruction being met; and
when the given condition-dependent instruction is a sequence-start instruction, the issue program logic is responsive to the determination or prediction to issue a sequence of instructions comprising the sequence-start instruction and at least one subsequent instruction.

* * * * *